United States Patent
Baek et al.

(10) Patent No.: US 12,232,076 B2
(45) Date of Patent: Feb. 18, 2025

(54) METHOD FOR POSITIONING SIDELINK AND DEVICE THEREFOR

(71) Applicant: LG ELECTRONICS INC., Seoul (KR)

(72) Inventors: Jongseob Baek, Seoul (KR); Hanbyul Seo, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/798,472

(22) PCT Filed: Feb. 19, 2021

(86) PCT No.: PCT/KR2021/002112
§ 371 (c)(1),
(2) Date: Aug. 9, 2022

(87) PCT Pub. No.: WO2021/167393
PCT Pub. Date: Aug. 26, 2021

(65) Prior Publication Data
US 2023/0076030 A1 Mar. 9, 2023

(30) Foreign Application Priority Data

Feb. 20, 2020 (KR) ............ 10-2020-0020963
Feb. 21, 2020 (KR) ............ 10-2020-0021350
Feb. 28, 2020 (KR) ............ 10-2020-0024909

(51) Int. Cl.
*G01S 13/87* (2006.01)
*H04W 64/00* (2009.01)
*H04W 92/18* (2009.01)

(52) U.S. Cl.
CPC ......... *H04W 64/006* (2013.01); *G01S 13/876* (2013.01); *H04W 92/18* (2013.01)

(58) Field of Classification Search
CPC ............... H04W 64/00; G02S 13/87
See application file for complete search history.

(56) References Cited

U.S. PATENT DOCUMENTS

2007/0150192 A1* 6/2007 Wakamatsu ............ G01S 19/49
701/469
2018/0364366 A1* 12/2018 Cvijetic ................ H04W 4/027
2020/0003861 A1* 1/2020 Eriksson ............ H04L 43/0864

FOREIGN PATENT DOCUMENTS

KR 101889635 B1 8/2018
WO 2016159712 A1 10/2016

OTHER PUBLICATIONS

Intel Corporation, "Sidelink physical layer procedures for NR V2X communication", 3GPP TSG RAN WG1 Meeting #98bis, Oct. 14-20, 2019, R1-1910653.
(Continued)

*Primary Examiner* — Michael T Vu
(74) *Attorney, Agent, or Firm* — BRYAN CAVE LEIGHTON PAISNER LLP

(57) ABSTRACT

The present invention relates to a method for performing positioning in a cellular-vehicle to everything (C-V2X) system, and a device therefor. A method for performing positioning in a terminal mounted on a positioning vehicle in a C-V2X communication system according to one aspect may comprise the steps of: measuring a time of flight (ToF) by performing road side unit (RSU) and round trip time (RTT) ranging; determining a positioning mode, wherein the positioning mode includes a self-positioning mode and a cooperative positioning mode; measuring the relative positions of surrounding vehicles by using a sensor provided in the positioning vehicle on the basis of the determined positioning mode being the cooperative positioning mode, and storing first positioning measurement information corresponding to the measured relative positions; selecting a
(Continued)

surrounding vehicle on which to perform cooperative positioning; transmitting the first positioning measurement information to the selected surrounding vehicle; receiving second positioning measurement information from the selected surrounding vehicle; and determining the current location of the positioning vehicle on the basis of the first and second positioning measurement information.

20 Claims, 20 Drawing Sheets

(56) References Cited

OTHER PUBLICATIONS

Fraunhofer IIS, "Definition of absolute and relative positioning", 3GPP TSG-SA WG1 Meeting #87, Aug. 19-23, 2019, S1-192412.
International Search Report from PCT/KR2021/002112, dated Jun. 9, 2021.

* cited by examiner (a)

(b)

(a)

(b)

METHOD FOR POSITIONING SIDELINK AND DEVICE THEREFOR

This application is the National Stage filing under 35 U.S.C. 371 of International Application No. PCT/KR2021/002112 filed on Feb. 19, 2021, which claims priority to Korean Patent Application Nos. 10-2020-0020963 filed on Feb. 20, 2020, 10-2020-0021350 filed on Feb. 21, 2020 and 10-2020-0024909 filed on Feb. 28, 2020, the contents of which are all hereby incorporated by reference herein in their entirety.

TECHNICAL FIELD

The present disclosure relates to sidelink positioning and, more particularly, to a technique of performing sidelink positioning using a single road side unit (RSU) in a new radio vehicle-to-everything (NR-V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

In an NR-V2X system, UEs or a UE and an anchor node (AN) need to effectively provide control information related to positioning when sidelink positioning is performed.

Sidelink positioning may be used for positioning between vehicles, and for vehicle safety, highly reliable position information between vehicles needs to be provided, and positioning control information needs to be effectively used in consideration of various factors that affect positioning.

DISCLOSURE

Technical Problem

An object to be solved is to provide a method of performing sidelink positioning using a single RSU in an NR-V2X positioning system and an apparatus therefor.

Another object is to provide a positioning method and apparatus capable of remarkably improving positioning accuracy of a positioning UE by sharing positioning measurement information between vehicles during cooperative positioning with a neighbor UE through sidelink.

Another object to be solved is to provide a positioning method and apparatus capable of effectively compensating for degradation of positioning performance that may occur when a measurement time point of a positioning UE and a measurement time point of a neighbor UE differ during cooperative positioning through sidelink.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of performing positioning by a user equipment (UE) mounted in a positioning vehicle in a cellular vehicle-to-everything (C-V2X) communication system, including measuring a time of flight (ToF) by performing round trip time (RTT) ranging with a road side unit (RSU), determining a positioning mode, wherein the positioning mode includes a self-positioning mode and a cooperative positioning mode, measuring a relative position of a neighbor vehicle using a sensor mounted in the positioning vehicle based on the determined positioning mode being the cooperative positioning mode, and storing first positioning measurement information related to the measured relative position, selecting a neighbor vehicle to perform cooperative positioning, transmitting the first positioning measurement information to the selected neighbor vehicle, receiving second positioning measurement information from the selected neighbor vehicle, and determining a current position of the positioning vehicle based on the first positioning measurement information and the second positioning measurement information.

In an embodiment, the RTT ranging may be performed with respect to a single RSU.

In an embodiment, the first positioning measurement information and the second positioning measurement information may include essential measurement information including at least one of information about an absolute position of a corresponding vehicle, information about reliability of the absolute position, information about a ToF measurement time at the corresponding vehicle, information about a relative position measured by the corresponding vehicle, or information about reliability of the relative position measured by the corresponding vehicle.

In an embodiment, the first positioning measurement information and the second positioning measurement information may further include additional measurement information including at least one of information about a time difference between a ToF measurement time and a relative position measurement time, information about a time difference between the ToF measurement time and a transmission time of the measured ToF, information about a vehicle speed during relative position measurement, or information about a heading angle during relative position measurement.

In an embodiment, the method may further include estimating a time duration between a ToF measurement time and a relative position measurement time of the neighbor vehicle based on the additional measurement information received from the selected neighbor vehicle, estimating change amounts of a speed and heading direction of the positioning vehicle related to the estimated time duration, and correcting the relative position received from the neighbor vehicle based on the estimated change amounts of the speed and heading direction of the positioning vehicle and on a speed and heading direction of the neighbor vehicle.

In an embodiment, the positioning mode may be determined based on whether the sensor is provided and on a collective perception message (CPM) received from the neighbor vehicle.

In an embodiment, an ID of a neighbor vehicle, the number of neighbor vehicles capable of performing cooperative positioning, and a positioning capability and level of a neighbor vehicle may be identified based on the CPM, and a neighbor vehicle to perform cooperative positioning may be determined based on the identified positioning capability and level of a neighbor vehicle.

In an embodiment, the sensor may include an inertial measurement unit including a gyroscope, an accelerometer, and a geomagnetic sensor. Based on the number of selected neighbor vehicles being one, cooperative positioning may be performed based on a relative position change amount according to vehicle position variation measured through the inertial measurement unit, the first positioning measurement information, and the second positioning measurement information. Based on the number of selected neighbor vehicles being two, cooperative positioning may be performed based on the first positioning measurement information and the second positioning measurement information.

In an embodiment, the first positioning measurement information and the second positioning measurement information may be transmitted and received through sidelink control information (SCI) of a physical sidelink control channel (PSCCH), SCI of a physical sidelink shared channel (PSSCH), or data of the PSSCH.

In an embodiment, the current position of the positioning vehicle may be determined based on absolute coordinates of the RSU, an absolute position of the positioning vehicle, a ToF measured at the positioning vehicle, an absolute position of the selected neighbor vehicle, and a ToF measured at the selected neighbor vehicle.

In another aspect of the present disclosure, provided herein is. a user equipment (UE) mounted in a positioning vehicle, for performing positioning, in a cellular vehicle-to-everything (C-V2X) communication system, including a radio frequency (RF) transceiver, and a processor connected to the RF transceiver. The processor measures a time of flight (ToF) by performing round trip time (RTT) ranging with a road side unit (RSU), determines a positioning mode, wherein the positioning mode includes a self-positioning mode and a cooperative positioning mode, measures a relative position of a neighbor vehicle using a sensor mounted in the positioning vehicle based on the determined positioning mode being the cooperative positioning mode, stores first positioning measurement information related to the measured relative position, selects a neighbor vehicle to perform cooperative positioning, transmits the first positioning measurement information to the selected neighbor vehicle, receives second positioning measurement information from the selected neighbor vehicle, and determines a current position of the positioning vehicle based on the first positioning measurement information and the second positioning measurement information.

In an embodiment, the processor may perform the RTT ranging with respect to a single RSU.

In an embodiment, the first positioning measurement information and the second positioning measurement information may include essential measurement information including at least one of information about an absolute position of a corresponding vehicle, information about reliability of the absolute position, information about a ToF measurement time at the corresponding vehicle, information about a relative position measured by the corresponding vehicle, or information about reliability of the relative position measured by the corresponding vehicle.

In an embodiment, the first positioning measurement information and the second positioning measurement information may further include additional measurement information including at least one of information about a time difference between a ToF measurement time and a relative position measurement time, information about a time difference between the ToF measurement time and a transmission time of the measured ToF, information about a vehicle speed during relative position measurement, or information about a heading angle during relative position measurement.

In an embodiment, the processor may estimate a time duration between a ToF measurement time and a relative position measurement time of the neighbor vehicle based on the additional measurement information received from the selected neighbor vehicle, estimate change amounts of a speed and heading direction of the positioning vehicle related to the estimated time duration, and correct the relative position received from the neighbor vehicle based on the estimated change amounts of the speed and heading direction of the positioning vehicle and on a speed and heading direction of the neighbor vehicle.

In an embodiment, the processor may determine the positioning mode based on whether the sensor is provided and on a collective perception message (CPM) received from the neighbor vehicle.

In an embodiment, the processor may identify an ID of a neighbor vehicle, the number of neighbor vehicles capable of performing cooperative positioning, and a positioning capability and level of a neighbor vehicle, based on the CPM, and determine a neighbor vehicle to perform cooperative positioning based on the identified positioning capability and level of a neighbor vehicle.

In an embodiment, the sensor may include an inertial measurement unit including a gyroscope, an accelerometer, and a geomagnetic sensor. Based on the number of selected neighbor vehicles being one, the processor may perform cooperative positioning based on a relative position change amount according to vehicle position variation measured through the inertial measurement unit, the first positioning measurement information, and the second positioning measurement information. Based on the number of selected neighbor vehicles being two, the processor may perform cooperative positioning based on the first positioning measurement information and the second positioning measurement information.

The first positioning measurement information and the second positioning measurement information may be transmitted and received through sidelink control information (SCI) of a physical sidelink control channel (PSCCH), SCI of a physical sidelink shared channel (PSSCH), or data of the PSSCH.

In an embodiment, the processor may determine the current position of the positioning vehicle based on absolute coordinates of the RSU, an absolute position of the positioning vehicle, a ToF measured at the positioning vehicle, an absolute position of the selected neighbor vehicle, and a ToF measured at the selected neighbor vehicle.

Advantageous Effects

Various embodiments may remarkably reduce anchor installation cost and maximize flexibility of a positioning operation by performing positioning through cooperation with a neighbor vehicle in a state in which access to a single RSU is possible in an NR-V2X positioning system.

Further, various embodiments may remarkably improve positioning accuracy of a positioning UE by sharing positioning measurement information between vehicles during cooperative positioning with a neighbor UE.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

BEST MODE

Figure 1:
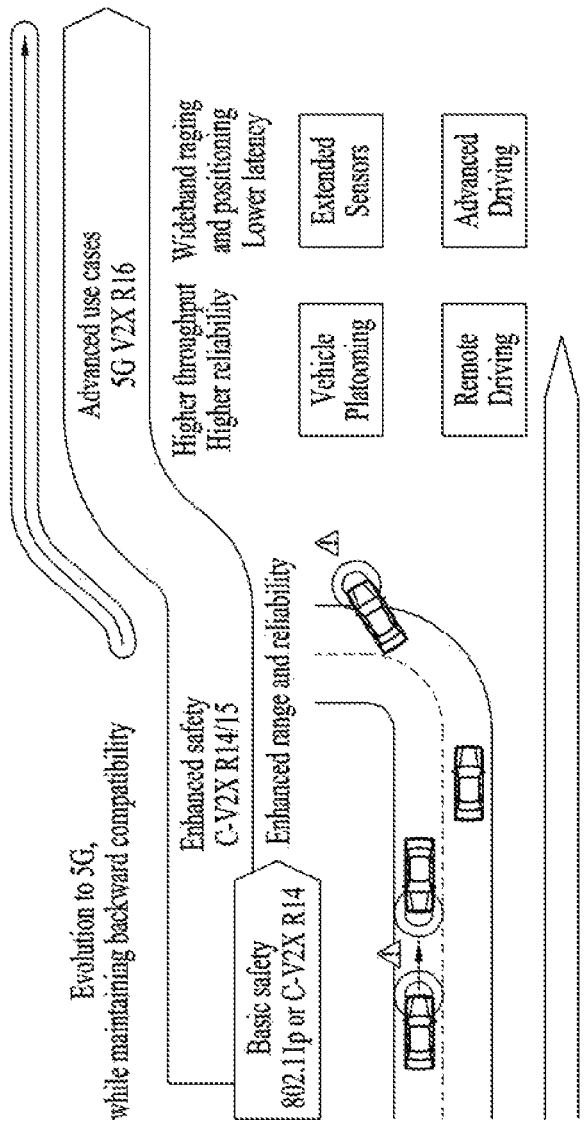
FIG. 1 is a diagram illustrating vehicle-to-everything (V2X) communication based on pre-new radio access technology (NR) RAT and V2X communication based on NR in comparison.

According to an aspect, a method of performing positioning by a user equipment (UE) mounted in a positioning vehicle in a cellular vehicle-to-everything (C-V2X) communication system may include measuring a time of flight (ToF) by performing round trip time (RTT) ranging with a road side unit (RSU), determining a positioning mode, wherein the positioning mode includes a self-positioning mode and a cooperative positioning mode, measuring a relative position of a neighbor vehicle using a sensor mounted in the positioning vehicle based on the determined positioning mode being the cooperative positioning mode, and storing first positioning measurement information related to the measured relative position, selecting a neighbor vehicle to perform cooperative positioning, transmitting the first positioning measurement information to the selected neighbor vehicle, receiving second positioning measurement information from the selected neighbor vehicle, and determining a current position of the positioning vehicle based on the first positioning measurement information and the second positioning measurement information.

BEST MODE FOR CARRYING OUT THE DISCLOSURE

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs 01-DMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
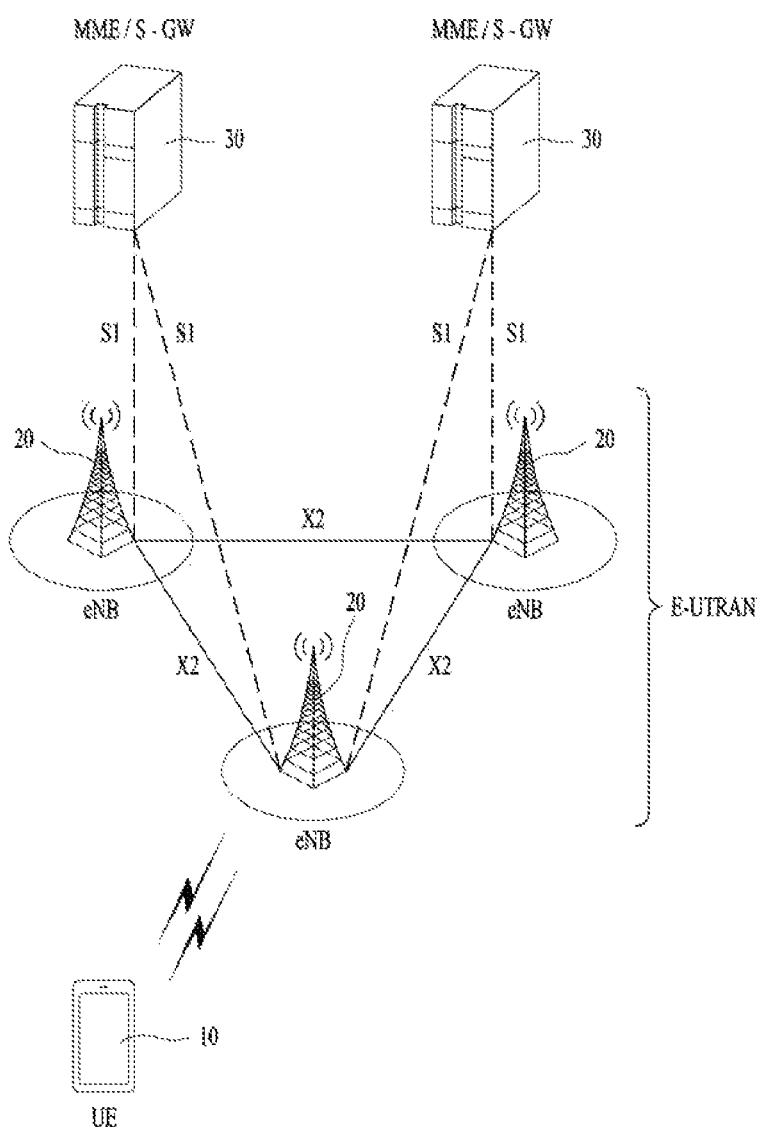
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
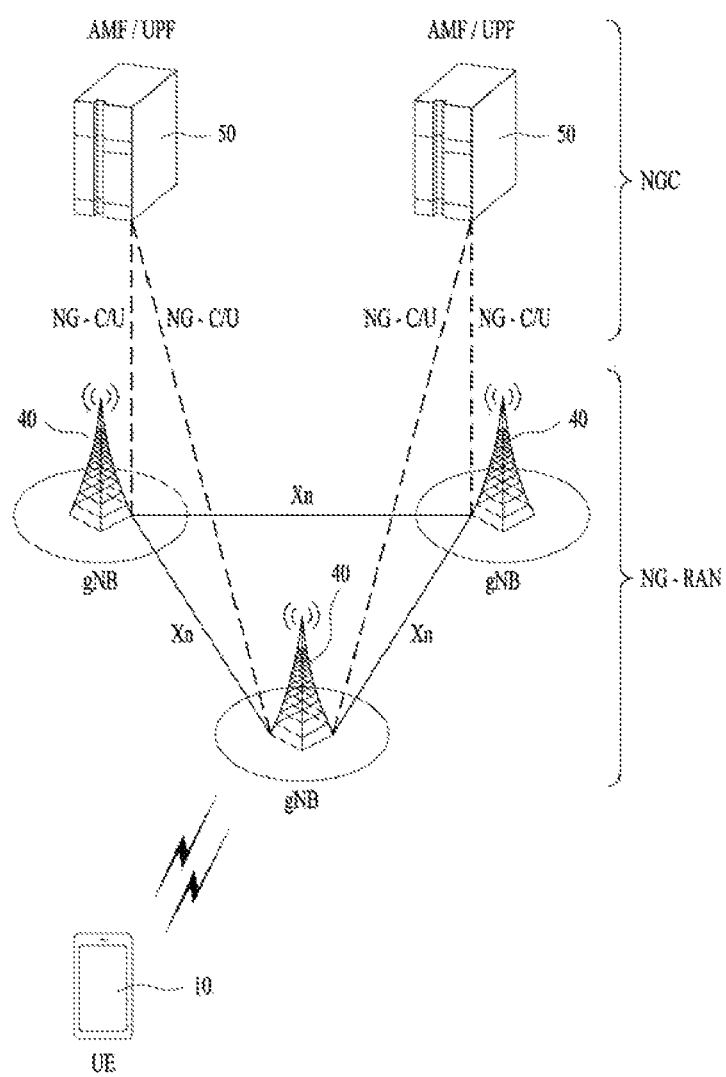
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
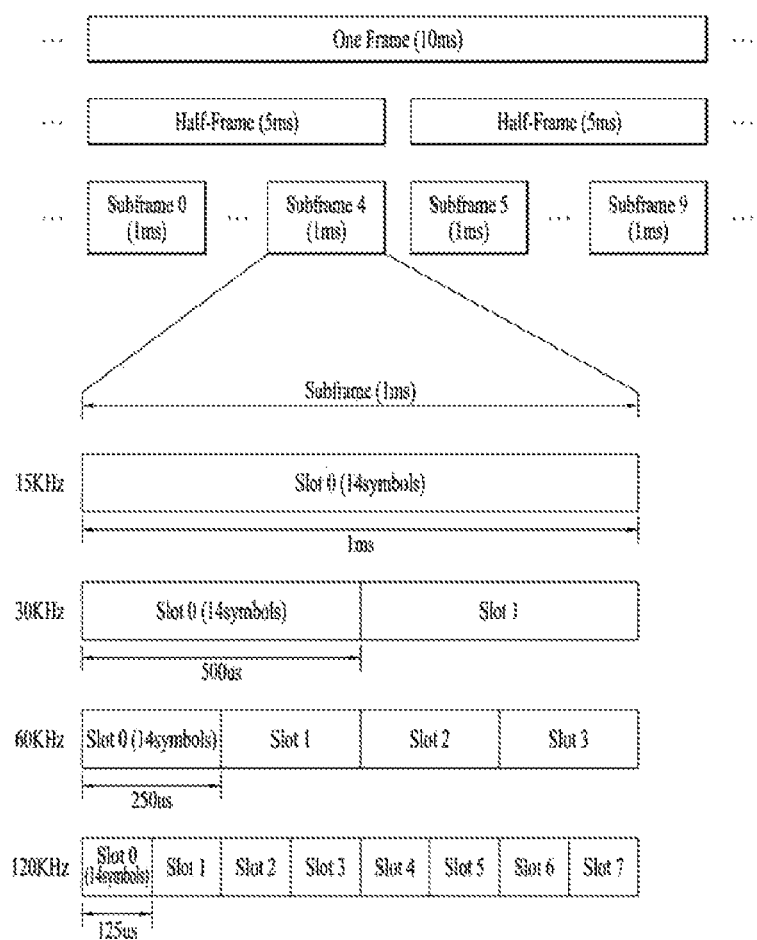
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15 * 2u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
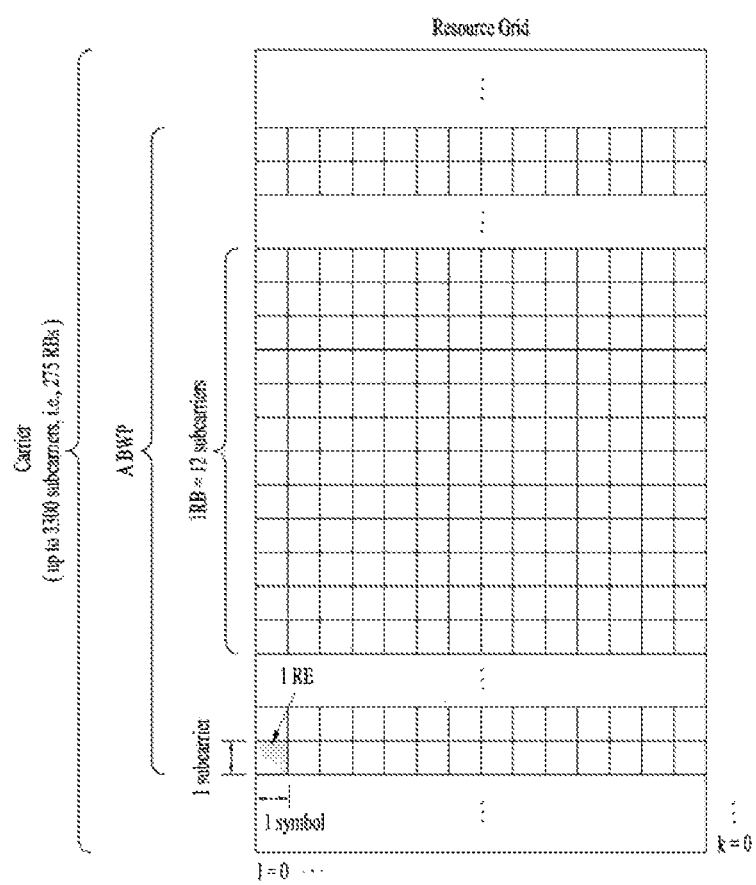
FIG. 5 is a diagram illustrating a slot structure in an NR frame.

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 6:
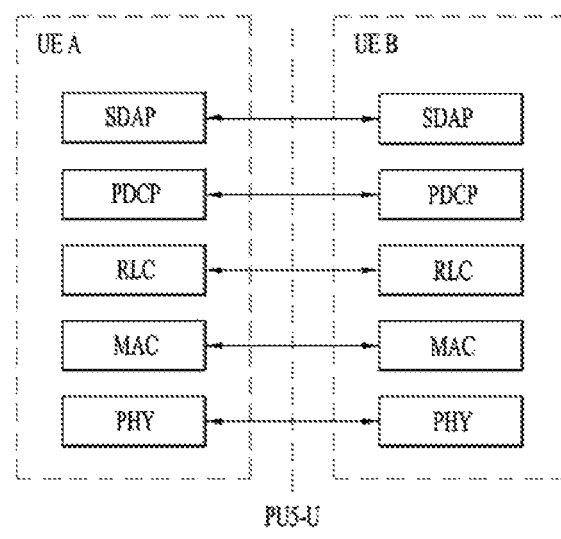
FIG. 6 is a diagram illustrating radio protocol architectures for sidelink (SL) communication.
Figure 6:
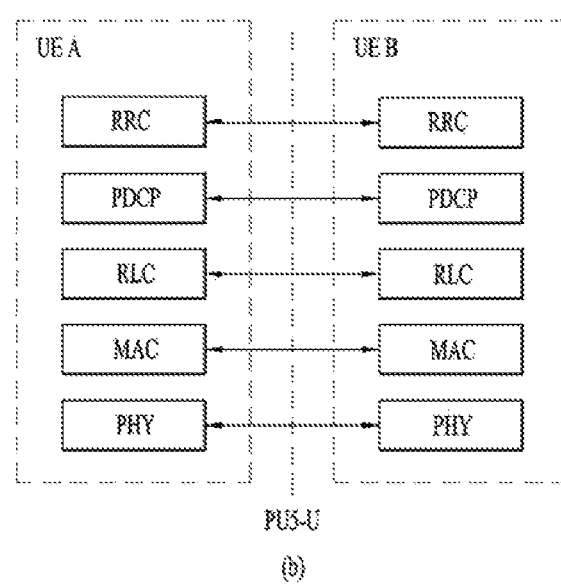

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
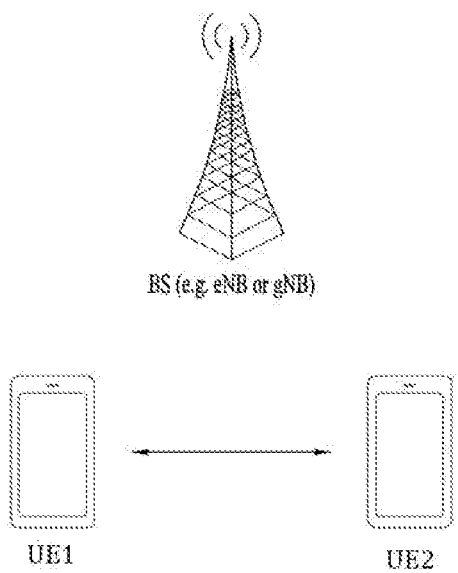
FIG. 7 is a diagram illustrating user equipments (UEs) which conduct V2X or SL communication between them.

FIG. 7 illustrates UEs that conduct V2X or SL communication between them.

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
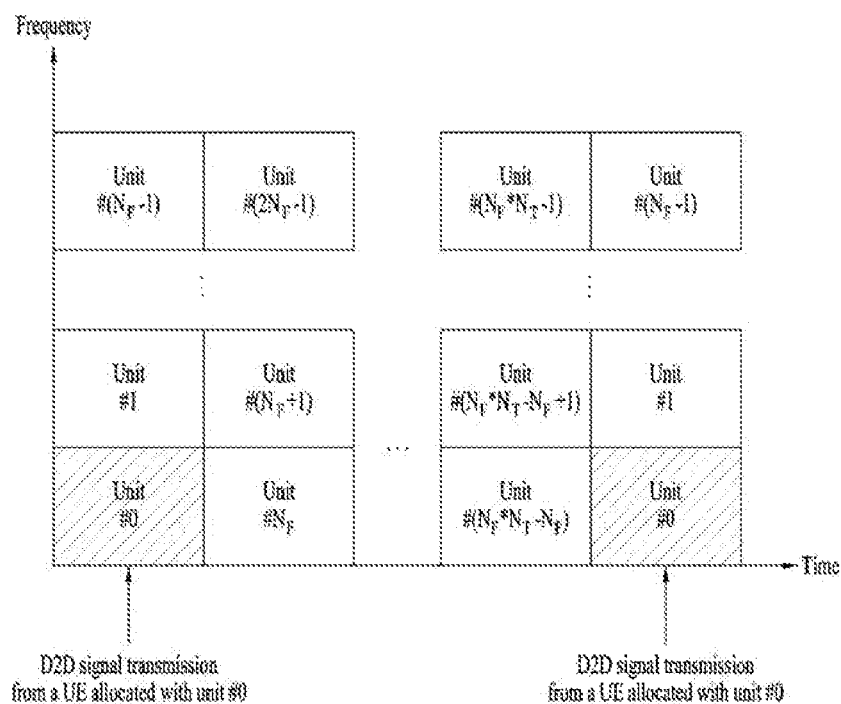
FIG. 8 is diagram illustrating resource units for V2X or SL communication.

FIG. 8 illustrates resource units for V2X or SL communication.

Referring to FIG. 8, the total frequency resources of a resource pool may be divided into NF frequency resources, and the total time resources of the resource pool may be divided into NT time resources. Thus, a total of NF*NT resource units may be defined in the resource pool. FIG. 8 illustrates an example in which the resource pool is repeated with a periodicity of NT subframes.

As illustrates in FIG. 8, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource pool unit, for transmission. In this case, an SA resource pool may refer to a resource pool in which an SA is multiplexed with SL data, for transmission. The SA may be referred to as an SL control channel.

An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
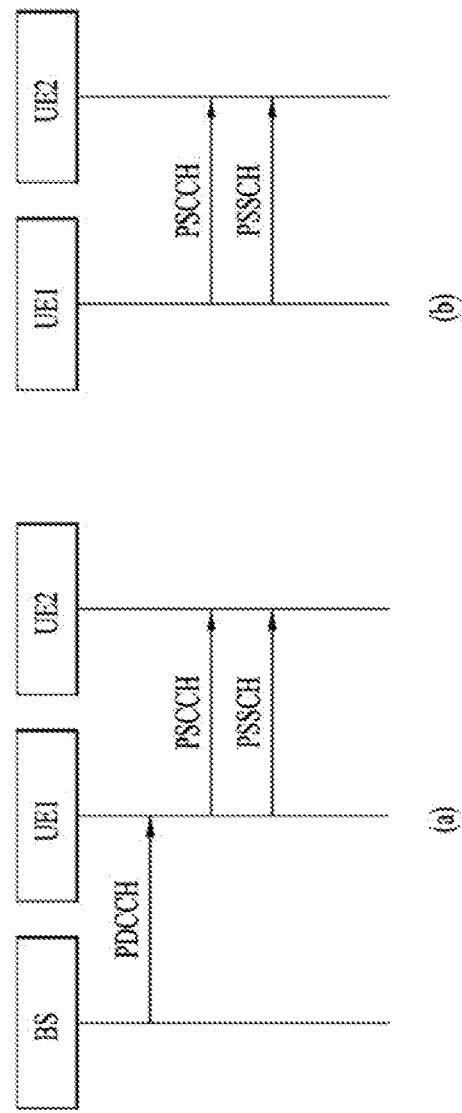
FIG. 9 is a diagram illustrating signal flows for V2X or SL communication procedures of a UE according to transmission modes.

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9(a) illustrates a UE operation related to LTE transmission mode 1 or LTE transmission mode 3. Alternatively, for example, FIG. 9 (a) illustrates a UE operation related to NR resource allocation mode 1. For example, LTE transmission mode 1 may be applied to general SL communication, and LTE transmission mode 3 may be applied to V2X communication.

For example, FIG. 9(b) illustrates a UE operation related to LTE transmission mode 2 or LTE transmission mode 4. Alternatively, for example, FIG. 9 (b) illustrates a UE operation related to NR resource allocation mode 2.

Referring to FIG. 9(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or
  an SL channel state information (CSI) report request indicator or SL (L1) RSRP (and/or SL (L1) reference signal received quality (RSRQ) and/or SL (L1) received signal strength indicator (RSSI)) report request indicator, and/or
  an SL CSI transmission indicator (on PSSCH) (or SL (L1) RSRP (and/or SL (L1) RSRQ and/or SL (L1) RSSI) information transmission indicator), and/or
  MCS information, and/or
  transmission power information, and/or
  L1 destination ID information and/or L1 source ID information, and/or
  SL HARQ process ID information, and/or
  new data indicator (NDI) information, and/or
  redundancy version (RV) information, and/or QoS information (related to transmission traffic/packet), for example, priority information, and/or An SL CSI-RS transmission indicator or information about the number of SL CSI-RS antenna ports (to be transmitted), and/or Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
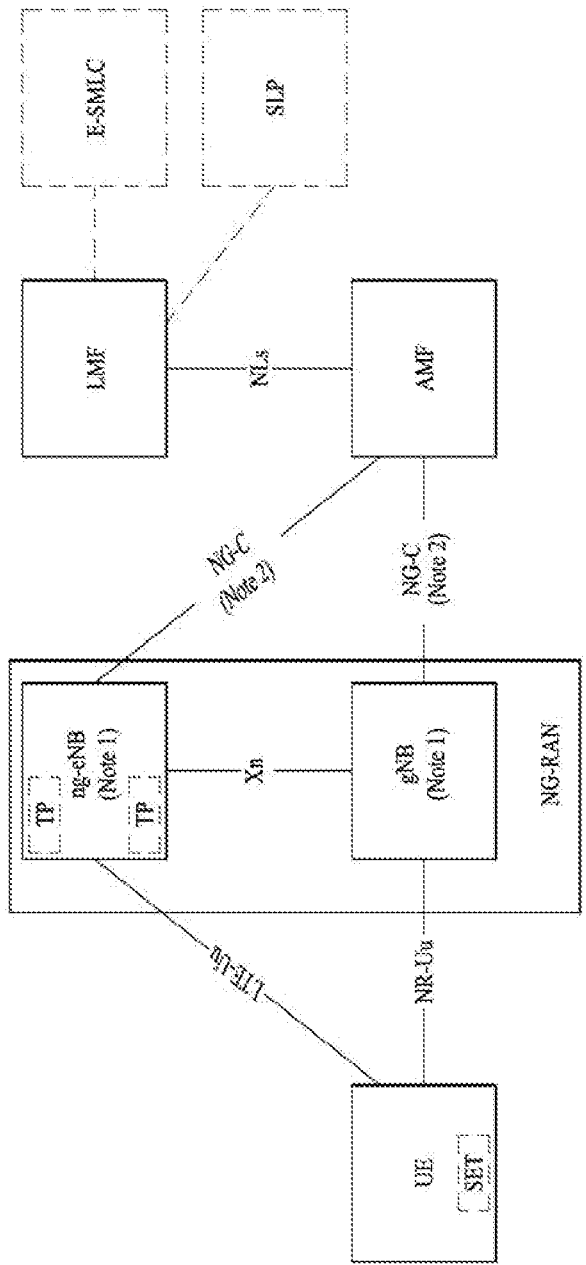
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDoA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
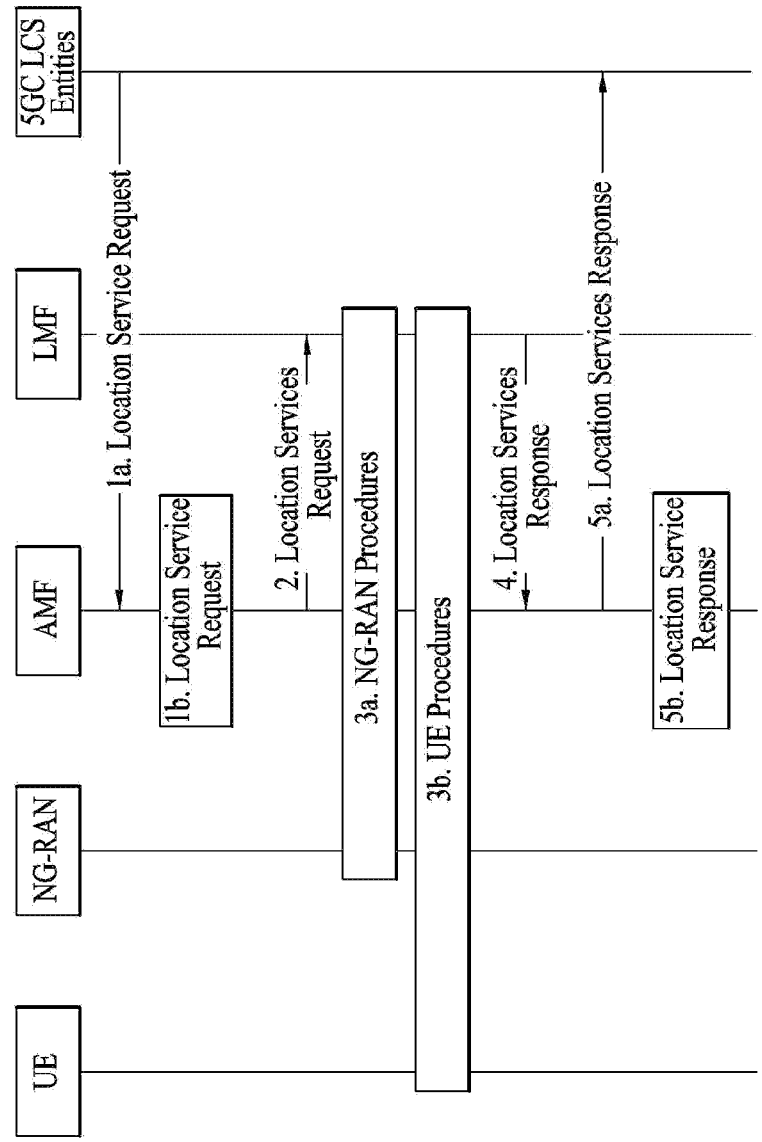
FIG. 11 illustrates exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 11 is initiated in step 1a, the AMF may deliver the location service response to the 5GC entity such as the GMLC. When the procedure of FIG. 11 is initiated in step 1b, the AMF may use the location service response to provide the location service related to an emergency call or the like. Hereinafter, a Hybrid Automatic Repeat Request (HARQ) procedure in a sidelink will be described.

An error compensation scheme for ensuring communication reliability may include a Forward Error Correction (FEC) scheme and an Automatic Repeat Request (ARQ) scheme. In the FEC scheme, error at a reception end may be corrected by adding an extra error correction code to information bits. The FEC scheme is advantageous in that time delay is low and information that is separately transmitted and received between transmission and reception ends is not required, but is disadvantageous in that system efficiency is degraded in a fine channel environment. The ARQ scheme has high transmission reliability, but is disadvantageous in that time delay occurs and system efficiency is degraded in a poor channel environment.

The Hybrid Automatic Repeat Request (HARQ) scheme is obtained by combining the FEC and the ARQ, and in this case, performance may be improving performance by checking whether data received by a physical layer contains error that is not capable of being decoded and requesting retransmission when error occurs.

In the case of SL unicast and groupcast, HARQ feedback and HARQ combining at a physical layer may be supported.

For example, when a reception UE operates in a resource allocation mode 1 or 2, the reception UE may receive a PSSCH from a transmission UE, and the reception UE may transmit HARQ feedback with respect to the PSSCH to the transmission UE using a Sidelink Feedback Control Information (SFCI) format through a physical sidelink feedback channel (PSFCH).

For example, the SL HARQ feedback may be enabled for unicast. In this case, in a non-Code Block Group (non-CBG) operation, the reception UE may decode the PSCCH with the reception UE as a target, and when the reception UE successfully decodes a transmission block related to the PSCCH, the reception UE may generate an HARQ-ACK. The reception UE may transmit the HARQ-ACK to the transmission UE. In contrast, when the reception UE decodes the PSCCH with the reception UE as a target and then does not successfully decode the transmission block related to the PSCCH, the reception UE may generate the HARQ-NACK. The reception UE may transmit the HARQ-NACK to the transmission UE.

When sidelink HARQ feedback is enabled for groupcast, the UE may determine whether to transmit HARQ feedback based on a TX-RX distance and/or RSRP. In the case of a non-CBG operation, two options may be supported.

Option 1: When a reception UE fails to decode a corresponding transport block after decoding a PSCCH associated to the reception UE, the reception UE may transmit HARQ-NACK on a PSFCH. Otherwise, the reception UE may not transmit a signal on the PSFCH.

Option 2: When the reception UE successfully decodes the transport block, the reception UE may transmit HARQ-ACK on the PSFCH. After the reception UE decodes an associated PSCCH using the reception UE as a target, if the reception UE does not successfully decode the corresponding transport block, the reception UE may transmit HARQ-NACK on the PSFCH.

In the case of mode 1 resource allocation, a time between HARQ feedback transmission on the PSFCH and the PSSCH may be (pre)configured. In the case of unicast and groupcast, when retransmission on sidelink is required, this may be indicated to an eNB by a UE within coverage using the PUCCH. The transmission UE may also transmit indication to a serving eNB of the transmission UE in the form of scheduling request (SR)/buffer status report (BSR) but not the form of HARQ ACK/NACK. Even if the eNB does not receive the indication, the eNB may schedule a sidelink retransmission resource to the UE.

In the case of mode 2 resource allocation, a time between HARQ feedback transmission on the PSFCH and the PSSCH may be (pre)configured.

Embodiment 1

In the present embodiment, a sidelink positioning method in a V2X communication system to obtain a current position by efficiently and flexibly performing positioning when a positioning vehicle enters a road or an area in which a single road side unit (RSU) is installed is described in detail.

Hereinafter, the terms for description of the present embodiment will be described.

An upper layer in a cellular vehicle-to-everything (C-V2X) system may include an application layer and a facilities layer.

A positioning mode may include a self-positioning mode and a cooperative positioning mode.

Self-positioning may be a method in which a positioning vehicle measures a current position thereof using only positioning measurement information measured thereby, without exchanging positioning measurement information with a neighbor vehicle or without receiving positioning measurement information from the neighbor vehicle.

Cooperative positioning may be a method in which the positioning vehicle measures a current position thereof using not only positioning measurement information measured thereby but also positioning measurement information provided by the neighbor vehicle.

A positioning reference signal (PRS) used for round trip time (RTT) ranging includes a request PRS and a response PRS. The request PRS means a PRS transmitted by the positioning vehicle to the neighbor RSU and/or the neighbor vehicle, and the response PRS means a PRS transmitted by the neighbor RSU and/or the neighbor vehicle to the positioning vehicle in response to the request PRS.

The PRS may be transmitted using various methods in various frequency bands or spectrums as follows.

The PRS may be transmitted in a licensed band, an unlicensed band, or a dedicated intelligent transport system (ITS) frequency band.

When PRS transmission in the licensed band and the ITS band is considered, the PRS may be transmitted using a physical feedback channel (PSFCH) resource or may be transmitted using a dedicated slot resource allocated for PRS transmission among logical slots (or physical slots) of an NR-V2X system.

When PRS transmission in the unlicensed band is considered, a resource for PRS transmission may share a resource allocated for a heterogeneous UE/access point (AP), such as Wi-Fi. In this case, the positioning UE may transmit the PRS by acquiring a resource through time division multiple access (TDMA) or contention with the heterogeneous UE/AP.

A positioning vehicle means a vehicle that transmits a request PRS in order to perform positioning, whereas a neighbor vehicle means a vehicle that participates in positioning to transmit a response PRS.

When a vehicle is requested to perform or participate in positioning by an upper layer, the vehicle transmits the request PRS or the response PRS.

An RSU according to the present disclosure may be replaced with a BS such as a gNB/eNB. When the RSU is replaced with the BS, the positioning vehicle may transmit a PRS through a Uu link with the BS and measure a time of flight (ToF).

A vehicle according to the present disclosure may be replaced with a mobile device, an automated guided vehicle (AGV), or a UE and may equally perform a similar positioning operation.

Next, a proposed operation and process necessary to perform self-positioning or cooperative positioning when a vehicle passes through an area (or road) in which one RSU is installed will be described in detail.

A process in which a positioning vehicle measures a ToF through RTT ranging with an RSU: The positioning vehicle may measure the ToF through RTT ranging with the RSU. In this case, the ToF may be measured using a PRS transmitted through sidelink. In addition, the positioning vehicle may record information about a time at which the positioning vehicle measures the ToF in an internal storage medium. Here, the ToF measurement time may include information about a time when a request PRS is transmitted, information about a time when a response PRS is received, and/or information about a time difference between the time when the request PRS is transmitted and the time when the response PRS is received.

A method and process of providing positioning measurement information needed to perform cooperative positioning through sidelink between vehicles: The process of providing the positioning measurement information between vehicles proposed in the present embodiment may be performed in three ways as follows.

Method-1: The positioning measurement information provided between vehicles may be provided when the positioning vehicle requests a neighbor vehicle to provide the positioning measurement information. In this case, the neighbor vehicle may be a vehicle designated or selected by the positioning vehicle or may be an unspecified vehicle. An embodiment in which the positioning vehicle designates or selects the neighbor vehicle to request the positioning measurement information is as follows. The positioning vehicle may identify which vehicle is located in close proximity thereto while securing a line-of-sight (LOS), which vehicle is equipped with an onboard sensor, and/or which degree of accuracy and/or reliability the mounted onboard sensor has, by detecting and analyzing a collective perception message (CPM) received from the neighbor vehicle. The positioning vehicle may determine whether the neighbor vehicle may sufficiently perform cooperative positioning based on information identified through the CPM. After selecting a neighbor vehicle suitable for cooperative positioning based on the above identified information, the positioning vehicle may request and obtain the positioning measurement information for cooperative positioning using an ID of the selected vehicle. As an example, the positioning vehicle may transmit a predetermined positioning request signal for requesting the positioning measurement information to the designated or selected neighbor vehicle through SCI of a PSCCH, SCI of a PSSCH, or data of the PSSCH of an NR-V2X service. As another example, the positioning vehicle may transmit the predetermined positioning request signal for requesting the positioning measurement information to the designated or selected neighbor vehicle through a CPM or other V2X messages. The neighbor vehicle that has received and/or accepted the request for the positioning measurement information may perform an operation of acquiring the positioning measurement information through relative position measurement, etc. and transmit the acquired positioning measurement information together with an ID of the positioning vehicle to the positioning vehicle through the CPM, or the SCI of the PSCCH, the SCI of the PSSCH, or the data of the PSSCH of the NR-V2X service.

Method-2: The positioning measurement information provided between vehicles may be provided at all times or periodically/aperiodically by a vehicle equipped with the onboard sensor regardless of a request by the positioning vehicle. For example, the vehicle equipped with the onboard sensor may periodically/aperiodically acquire the related positioning measurement information in consideration of cooperative positioning support and then transmit the positioning measurement information to the neighbor vehicle through the CPM or through the SCI of the PSCCH, the SCI of the PSSCH, or the data of the PSSCH of the NR-V2X service. The positioning vehicle may determine whether to perform cooperative positioning or whether cooperative positioning is needed by detecting and analyzing the positioning measurement information provided by the neighbor vehicle.

Method-3: The positioning measurement information provided between vehicles may be obtained when the positioning vehicle requests the neighbor vehicle to provide the positioning measurement information or may be periodically/aperiodically obtained regardless of whether the positioning vehicle requests the positioning measurement information, according to the content (or type) of the positioning measurement information. That is, Method-1 and Method-2 described above may be adaptively applied according to the content (or type) of the positioning measurement information. For example, information about a relative position measured through the onboard sensor, information about the speed of a vehicle during relative position measurement, information about a heading angle of a vehicle during relative position measurement, which are measured through the onboard sensor among the positioning measurement information, may be included in the CPM and may be periodically/aperiodically provided to the positioning vehicle by the neighbor vehicle irrespective of the request by the positioning vehicle. On the other hand, among the positioning measurement information, information about a ToF measured between a vehicle and an RSU and information about a time difference between a time at which the ToF is measured and a time at which a relative position of the neighbor vehicle is measured may be obtained by the neighbor vehicle at the request of the positioning vehicle as in Method-1 and then may be transmitted to the positioning vehicle through the SCI of the PSCCH, the SCI of the PSSCH, or the data of the PSSCH of the NR-V2X service. In this case, the positioning vehicle may acquire information about the neighbor vehicle (or neighbor vehicle ID) to request the corresponding positioning measurement information by receiving and analyzing the above-described CPM. The positioning measurement information for cooperative positioning will be clearer through description of drawings to be described later.

A method and process in which the positioning vehicle selects positioning to be performed from among self-positioning and cooperative positioning: The upper layer of the C-V2X system may flexibly select a positioning method to be performed by the positioning vehicle, i.e., a positioning mode, in consideration of various variables such as the number of neighbor vehicles, availability/non-availability of the positioning measurement information of a neighbor vehicle, and a reliability/accuracy level of positioning measurement. Hereinafter, the case in which the upper layer selects the self-positioning method and the case in which the upper layer selects the cooperative positioning method will be described in detail.

Case in which the upper layer of the positioning vehicle selects the self-positioning method: For example, when the positioning vehicle has no information about an absolute position or when the reliability of the absolute position is lower than a threshold although the information about the absolute position is present, the self-positioning method may be selected. As another example, when the positioning vehicle is not equipped with the onboard sensor, the self-positioning method may be selected. That is, when the positioning vehicle is incapable of acquiring relative position information about the neighbor vehicle through the onboard sensor, even if the positioning vehicle receives the positioning measurement information for cooperative positioning from the neighbor vehicle, the positioning vehicle is incapable of detecting positioning measurement information, internally obtained from the ego vehicle, corresponding to the positioning measurement information received from the neighbor vehicle. As a result, the positioning vehicle fails to perform cooperative positioning. As another example, when there is no neighbor vehicle capable of performing cooperative positioning, the self-positioning method may be selected. Here, whether a neighbor vehicle is present may be identified using the onboard sensor of the positioning vehicle or through a CPM received from the neighbor vehicle. For example, if there is no CPM received from a neighbor vehicle, the upper layer may determine that a neighbor vehicle is not present or that a neighbor vehicle equipped with the sensor for positioning is not present. As another example, if there is a neighbor vehicle equipped with the sensor for positioning but the reliability and/or accuracy of the mounted sensor does not satisfy a reference value, the upper layer may select the self-positioning method by determining that it is difficult to acquire the positioning measurement information for cooperative positioning from the neighbor vehicle. In this case, the accuracy of the sensor of the neighbor vehicle may be confirmed by analyzing a received CPM. As another example, when the upper layer requests the neighbor vehicle to provide the positioning measurement information but there is no neighbor vehicle participating in (or accepting) the request, the upper layer may select the self-positioning method.

Case in which the upper layer of the positioning vehicle selects the cooperative positioning method: When the positioning vehicle is equipped with the onboard sensor and there is more than one neighbor vehicle that may provide reliable positioning measurement information for cooperative positioning, the upper layer may select the cooperative positioning method.

An operation and operation method of the upper layer of the C-V2X system for positioning: The upper layer may confirm whether a vehicle has entered an area in which an RSU is installed or whether there is an RSU around a vehicle, through a received V2X service, and receive control configuration information including PRS scheduling information required to perform positioning with the detected RSU. The upper layer may determine whether to perform positioning based on the detected RSU by analyzing a reliability/accuracy level of an absolute position which is being measured and updated by a vehicle. For example, if the upper layer determines that positioning is necessary because an accuracy level of a current absolute position is lower than a threshold, the upper layer may determine whether to perform self-positioning or cooperative positioning based on the presence/absence of a neighbor vehicle, a positioning capability of the neighbor vehicle, and/or positioning measurement information provided by the neighbor vehicle. When it is determined to perform positioning, the upper layer may request a lower layer of the C-V2X system to perform ToF measurement through an RTT ranging operation with the RSU. The upper layer may generate a CPM using positioning measurement information necessary for the neighbor vehicle to perform cooperative positioning. Here, the positioning measurement information provided by the positioning vehicle to the neighbor vehicle may be provided to the neighbor vehicle through a newly defined CPM or may be provided to the neighbor vehicle by being included a conventionally defined CPM. The upper layer may detect related positioning measurement information from the CPM received from the neighbor vehicle and store the detected positioning measurement information in a positioning information storage device.

A method in which the positioning vehicle performs self-positioning using a measured ToF and an inertial measurement unit (IMU): The positioning vehicle may measure a position change amount according to position change of a vehicle (or a relative position of a neighbor vehicle corresponding to two points changed according to the movement of the vehicle) using the IMU including a gyroscope, an accelerometer, a geomagnetic sensor, etc. In this case, the accuracy of measurement of the position change amount may vary depending on the accuracy of a sensor provided in the IMU.

Figure 12:
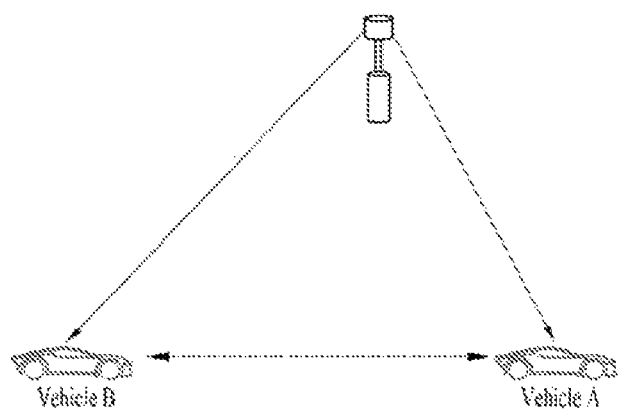
FIG. 12 is a diagram illustrating various positioning scenarios using a single RSU according to the number of neighbor vehicles capable of performing cooperative positioning according to an embodiment.
Figure 12:
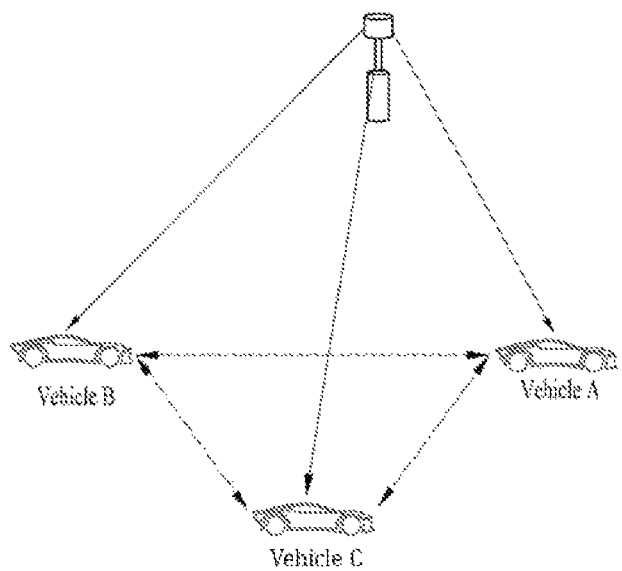

A method in which the positioning vehicle performs cooperative positioning using positioning measurement information received from a neighbor vehicle: The positioning vehicle may perform cooperative positioning using positioning measurement information measured thereby and positioning measurement information obtained from the neighbor vehicle. Here, the cooperative positioning method may be differently operated as follows according to the number of neighbor vehicles capable of performing cooperative positioning. FIG. 12 illustrates various positioning scenarios using a single RSU according to the number of neighbor vehicles capable of performing cooperative positioning. FIG. 12(a) illustrates a scenario for performing cooperative positioning when one neighbor vehicle capable of cooperative positioning with a positioning vehicle is present around a single RSU, and FIG. 12(b) illustrates a scenario for performing cooperative positioning when two neighbor vehicles capable of performing cooperative positioning with a positioning vehicle are present around a single RSU. Referring to FIG. 12(a), a positioning vehicle A may measure a relative position between two changed points using an IMU used for self-positioning and perform cooperative positioning using the measured relative position and positioning measurement information provided by a neighbor vehicle B. Referring to FIG. 12(b), the positioning vehicle A may perform cooperative positioning using positioning measurement information provided by two neighbor vehicles B and C.

Next, a method in which the positioning vehicle detects related positioning measurement information from a CPM received from the neighbor vehicle will be described as a preceding process for performing cooperative positioning. The positioning vehicle compares a relative position of the neighbor vehicle measured thereby, stored in a positioning information storage device, i.e., an internal memory, with a relative position of the positioning vehicle included in a CPM received from the neighbor vehicle. In this case, it is assumed that the relative position is generated based on global coordinates. That is, the relative position for the neighbor vehicle observed from the positioning vehicle and the relative position for the positioning vehicle observed from the neighbor vehicle correspond to each other and, if a degree of correspondence is within an error range, corresponding positioning measurement information may be stored in the positioning information storage device.

Next, a cooperative positioning procedure performed by the positioning vehicle will be described in detail as an embodiment of various positioning procedures that may be performed based on a main operation for performing self-positioning or cooperative positioning described above. Assumptions for performing the cooperative positioning procedure will be described below.

The assumptions for performing the cooperative positioning procedure are as follows.

A sensor operation of a vehicle is performed at all times or at regular time intervals, and the neighbor vehicle may measure positioning-related information necessary to perform cooperative positioning through a lidar/radar sensor, an odometer sensor, a geomagnetic sensor, and/or an IMU.

The positioning vehicle may measure a relative position of the neighbor vehicle through the mounted onboard sensor and periodically/aperiodically store the measured relative position of the neighbor vehicle and additional information related to relative position measurement in the positioning information storage device.

The positioning vehicle may confirm, through the upper layer of the C-V2X system, that a vehicle has entered an area in which the RSU is installed and that there are two or more neighbor vehicles capable of providing positioning measurement information for cooperative positioning.

Method-3 described above may be considered as a method of providing positioning measurement information between vehicles.

The positioning vehicle may obtain, using the mounted onboard sensor, the positioning measurement information including information about the relative position of the neighbor vehicle, information about the speed of the positioning vehicle during measurement of the relative position, and information about a heading angle of the positioning vehicle during measurement of the relative position and periodically/aperiodically provide the obtained positioning measurement information to the neighbor vehicle by being included in a CPM.

Among the positioning measurement information, information about a ToF measured between the neighbor vehicle and the RSU and information about a time difference between a time at which the ToF is measured and a time at which the relative position of the neighbor vehicle is measured may be obtained by the neighbor vehicle at the request of the positioning vehicle and then be transmitted to the positioning vehicle through SCI of a PSCCH, SCI of a PSSCH, or data of the PSSCH of an NR-V2X service.

Hereinafter, a procedure (Step-1 to Step-5) for performing cooperative positioning according to the above assumptions will be described in detail.

Step-1: The upper layer of the C-V2X system may transmit ID information of a neighbor vehicle capable of providing positioning measurement information for cooperative positioning to the lower layer and request that a neighbor vehicle designated through the lower layer provide the positioning measurement information for cooperative positioning. In addition, the upper layer may request that the lower layer obtain positioning measurement information corresponding to the positioning measurement information for which a request is made to the neighbor vehicle, such as the information about the ToF measured between the neighbor vehicle and the RSU and the information about the time difference between the time at which the ToF is measured and the time at which the relative position of the neighbor vehicle is measured.

Step-2: The lower layer that has received a request for ToF measurement between the positioning vehicle and the RSU from the upper layer may perform RTT ranging through a request/response PRS transmission/reception process through sidelink with the RSU. Thereafter, the lower layer may acquire a ToF obtained by performing RTT ranging and information about a time difference between a time at which the ToF is measured and a time at which a relative position of a neighbor vehicle (stored in the positioning information storage device) is measured and transmit the obtained ToF and information to the upper layer. In addition, the lower layer may request a corresponding neighbor vehicle to provide the positioning measurement information through the SCI of the PSCCH, the SCI of the PSSCH, or the data of the PSSCH of the NR-V2X service based on the ID of the neighbor vehicle received from the upper layer. In this case, the SCI of the PSCCH, the SCI of the PSSCH, or data of the PSSCH of the NR-V2X service may include information such as the ID of the neighbor vehicle and an indicator indicating a request for the positioning measurement information.

Step-3: The neighbor vehicle that has been requested to provide measurements for cooperative positioning from the positioning vehicle performs RTT ranging through the request/response PRS transmission/reception process through sidelink with the RSU. As a subsequent process, the lower layer of the neighbor vehicle may acquire the ToF obtained by performing RTT ranging and the information about the time difference between the time at which the ToF is measured and the time at which the relative position of the neighbor vehicle (stored in the positioning information storage device) is measured and transmit the obtained ToF and information to the positioning vehicle through the SCI of the PSCCH, the SCI of the PSSCH, or the data of the PSSCH of the NR-V2X service.

Step-4: The positioning vehicle may transmit the positioning measurement information received from the neighbor vehicle to the upper layer or store the positioning measurement information in the positioning information storage device.

Step-5: The positioning vehicle (or upper layer) may calculate an absolute position thereof using the positioning measurement information, which is measured by the ego vehicle and stored in the ego vehicle, and the positioning measurement information obtained from the neighbor vehicle.

A process of calculating an absolute position in consideration of the scenario of FIG. 12(b) will now be described in detail as an embodiment.

Variables for calculating an absolute position of the positioning vehicle A may be defined as follows.

Absolute coordinates of the RSU: $(x_0, y_0)$

Variables related to the positioning vehicle A:

The absolute position of the positioning vehicle A to be calculated: $(x, y)$

A ToF between the RSU and the positioning vehicle A, measured through RTT ranging: $ToF_a$ Variables related to the neighbor vehicle B:

An absolute position of the neighbor vehicle B: $(x+\Delta x_b, y+\Delta y_b)$

A ToF between the RSU and the neighbor vehicle B, measured through RTT ranging: $ToF_b$ Here, a relative position between the positioning vehicle A and the neighbor vehicle B may be calculated by the following equation.

$$(\Delta x_b, \Delta y_b) = (\Delta x'_b, y, \Delta y'_b) + (\delta_x, \delta_y)$$

A value obtained by correcting a relative position change amount $(\delta_x, \delta_y)$, that may arise due to mismatch between a time at which $ToF_b$ is measured and a time at which the relative position is measured using a sensor, with respect to a relative position $(\Delta x'_b, y, \Delta y'_b)$ received from the neighbor vehicle B may be determined to be a final relative position of the neighbor vehicle B. Details will be described later.

Variables related to the neighbor vehicle C:

An absolute position of the neighbor vehicle C: $(x+\Delta x_c, y+\Delta y_c)$

A ToF between the RSU and the neighbor vehicle C, measured through RTT ranging: $ToF_c$ Here, a relative position between the positioning vehicle A and the neighbor vehicle C may be calculated in the same way as the above-described relative position calculation between the positioning vehicle A and the neighbor vehicle B.

From the variables defined above, three equations may be generated as follows.

$$\sqrt{(x_0-x)^2+(y_0-y)^2}=ToF_a\cdot c \quad (1)$$

$$\sqrt{(x_0-(x+\Delta x_b))^2+(y_0-(y+\Delta y_b))^2}=ToF_b\cdot c \quad (2)$$

$$\sqrt{(x_0-(x+\Delta x_c))^2+(y_0-(y+\Delta y_c))^2}=ToF_b\cdot c \quad (3)$$

The absolute position (x, y) of the positioning vehicle may be calculated from the above equations (1) to (3). Here, c is a constant multiplied by the ToF measured at each vehicle.

Hereinafter, the positioning measurement information provided between vehicles for cooperative positioning will be described in detail. In an embodiment, the positioning measurement information may be divided into essential measurement information and additional measurement information. The essential measurement information means information essential for cooperative positioning, and the additional measurement information may mean information additionally necessary to further improve cooperative positioning performance.

Hereinafter, the essential measurement information will be described in detail.

In an embodiment, the essential measurement information may include at least one of information about an absolute position of a corresponding vehicle, information about reliability of the absolute position of the corresponding vehicle, information about a ToF measured at the corresponding vehicle, information about a relative position of another vehicle measured by the corresponding vehicle, or information about reliability of the relative position of another vehicle measured by the corresponding vehicle.

Here, the reliability of the absolute position information may aid the positioning vehicle in improving performance for detecting a neighbor vehicle. In this case, the reliability of the absolute position may be provided through an error variance for absolute position measurement. The reliability of the relative position information may help to improve the positioning algorithm performance of the neighbor vehicle. The reliability of the relative position information may be provided through an error variance for relative position measurement, information obtained through the error variance, or reliability level information of a sensor used for relative position measurement. In this case, the error variance is inversely proportional to the reliability of the relative position.

A relative position measured by each vehicle may be measured with respect to one or more other vehicles.

Next, the additional measurement information will be described in detail.

In an embodiment, the additional measurement information may include at least one of information about a time difference of a ToF measurement time and a relative position measurement time (TDTR) at a corresponding vehicle, information about a time difference of a ToF measurement time and a ToF transmission time (TDTT) at the corresponding vehicle, information about the speed of the corresponding vehicle, or information about a heading direction of the corresponding vehicle. Here, the speed and heading direction of the vehicle may be measured with respect to a duration between the ToF measurement time and the relative position measurement time.

The additional measurement information may be provided in order to minimize a problem caused by mismatch between the ToF measurement time and the relative position measurement time using the onboard sensor. For example, in a situation in which a positioning vehicle and a neighbor vehicle are present, it is assumed that there is a time difference between a time at which the neighbor vehicle measures a relative position of the positioning vehicle and a time at which the neighbor vehicle measures a ToF with the RSU. In this case, when the speed or direction of a vehicle is changed during the generated time difference, the neighbor vehicle may determine that the relative position measured at a previous time may be changed from the viewpoint of the time at which the ToF is measured. Therefore, in order to predict and correct the change amount of the measured relative position, information about the speed and heading direction of the vehicle during the same time period in the positioning vehicle is required. Therefore, the neighbor vehicle may provide the above-described additional measurement information to the positioning vehicle so that the positioning vehicle may predict and correct the change amount of the relative position provided by the neighbor vehicle.

Figure 13:
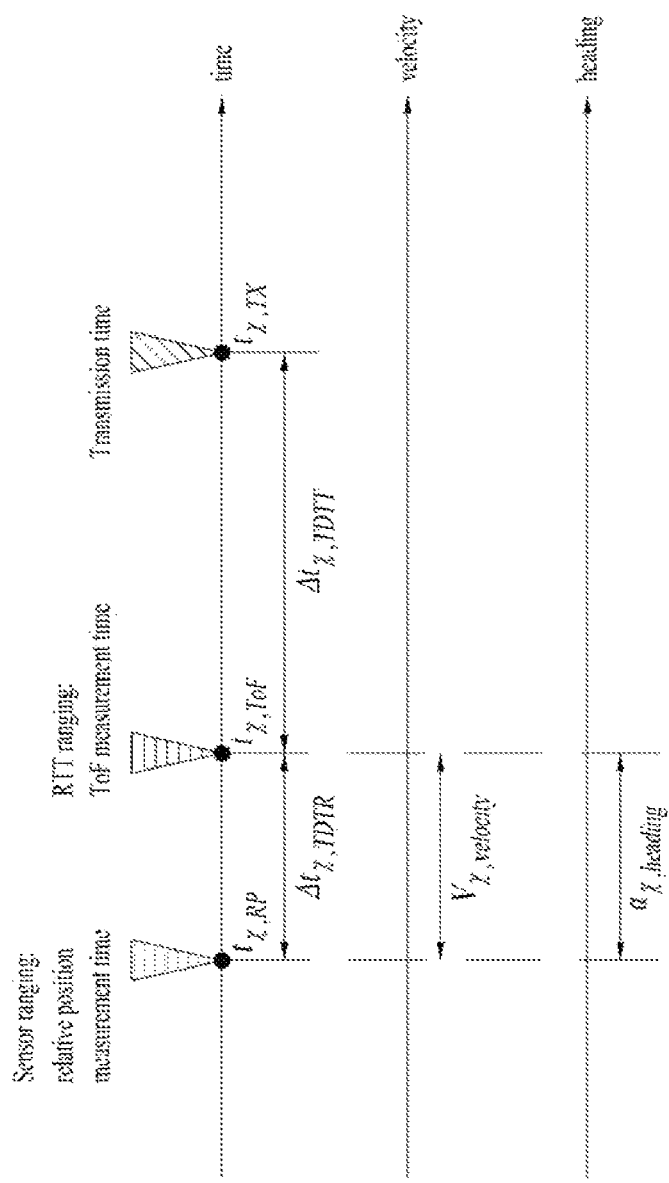
FIG. 13 is a diagram illustrating additional measurement information for correcting a relative position according to an embodiment.

FIG. 13 is a diagram illustrating additional measurement information for correcting a relative position according to an embodiment.

Referring to FIG. 13, a TDTR may be calculated as $\Delta t_{x,TDTR} = t_{ToF} - t_{RP}$, and a TDTT may be calculated as $\Delta t_{x,TDTT} = t_{TX} - t_{ToF}$. $v_{x,velocity}$ and $\alpha_{x,heading}$ mean the speed and heading direction of a vehicle measured during a duration of $\Delta t_{x,TDTR}$, respectively.

Figure 14:
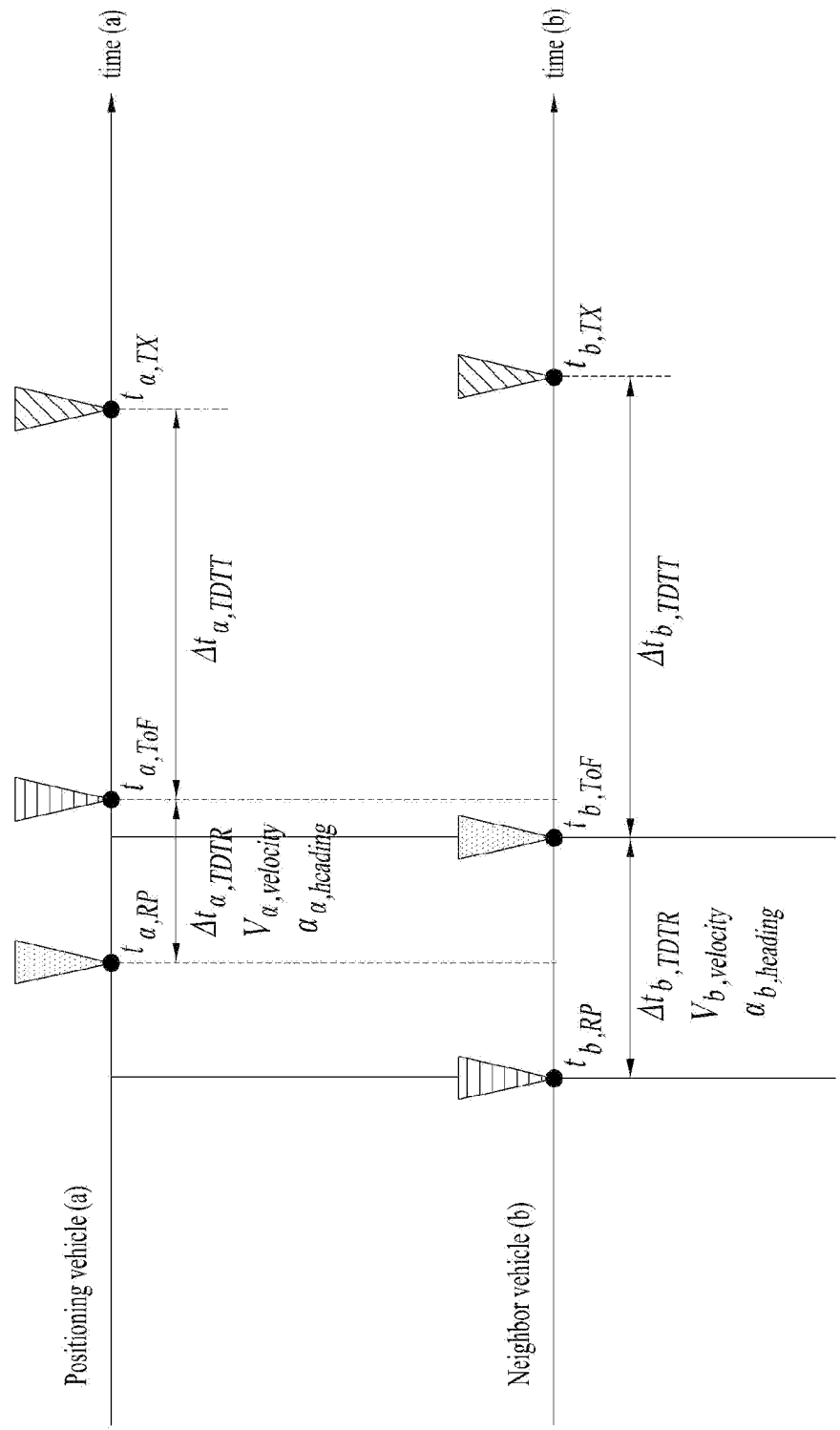
FIG. 14 is a diagram illustrating a method of predicting a relative position change amount according to an embodiment.

FIG. 14 is a diagram illustrating a method of predicting a relative position change amount according to an embodiment.

FIG. 14 illustrates an embodiment of a method in which a positioning vehicle predicts a relative position change amount received from a neighbor vehicle using the above-described additional measurement information in a situation in which the positioning vehicle and the neighbor vehicle are present. Here, it is assumed that each vehicle measures the speed and heading direction of the vehicle for a predetermined time based on a ToF measurement time and stores the measured information in the positioning information storage device.

The relative position change amount may be calculated through Step-1 to Step-3 below.

Step-1: The positioning vehicle may predict a time at which a ToF is obtained from the neighbor vehicle and a time at which a relative position is measured by using positioning measurement information provided by the neighbor vehicle. Through Step-1, the positioning vehicle may measure a vehicle speed and direction that have been changed during the same time period as the neighbor vehicle. Referring to FIG. 14, the positioning vehicle may predict a time $t_{b,ToF}$ at which the neighbor vehicle measures the ToF by subtracting a time $\Delta t_{b,TDTT}$ consumed to transmit a message including the positioning measurement information by the neighbor vehicle to the positioning vehicle from $\Delta t_{b \to a,P}$ at which the message is received from the neighbor vehicle. Furthermore, the positioning vehicle may predict a time $t_{b,RP}$ at which the neighbor vehicle measures the relative position using $\Delta t_{b,TDTR}$. $\Delta t_{b \to a,P}$ may be calculated using the relative position of the neighbor vehicle measured by the positioning vehicle or using the relative position provided by the neighbor vehicle.

Step-2: The positioning vehicle may acquire change amounts of the speed and direction of the vehicle corresponding to a time duration predicted in Step-1 based on the positioning measurement information stored in the internal positioning information storage device.

Step-3: The positioning vehicle may correct the relative position of the neighbor vehicle by predicting the relative position change amount provided by the neighbor vehicle using a vehicle speed and heading direction $v_{b,velocity}$ and $\alpha_{b,heading}$ provided by the neighbor vehicle and using a vehicle speed and heading direction $v_{a,velocity}$ and $\alpha_{a,heading}$ obtained by the positioning vehicle.

Figure 15:
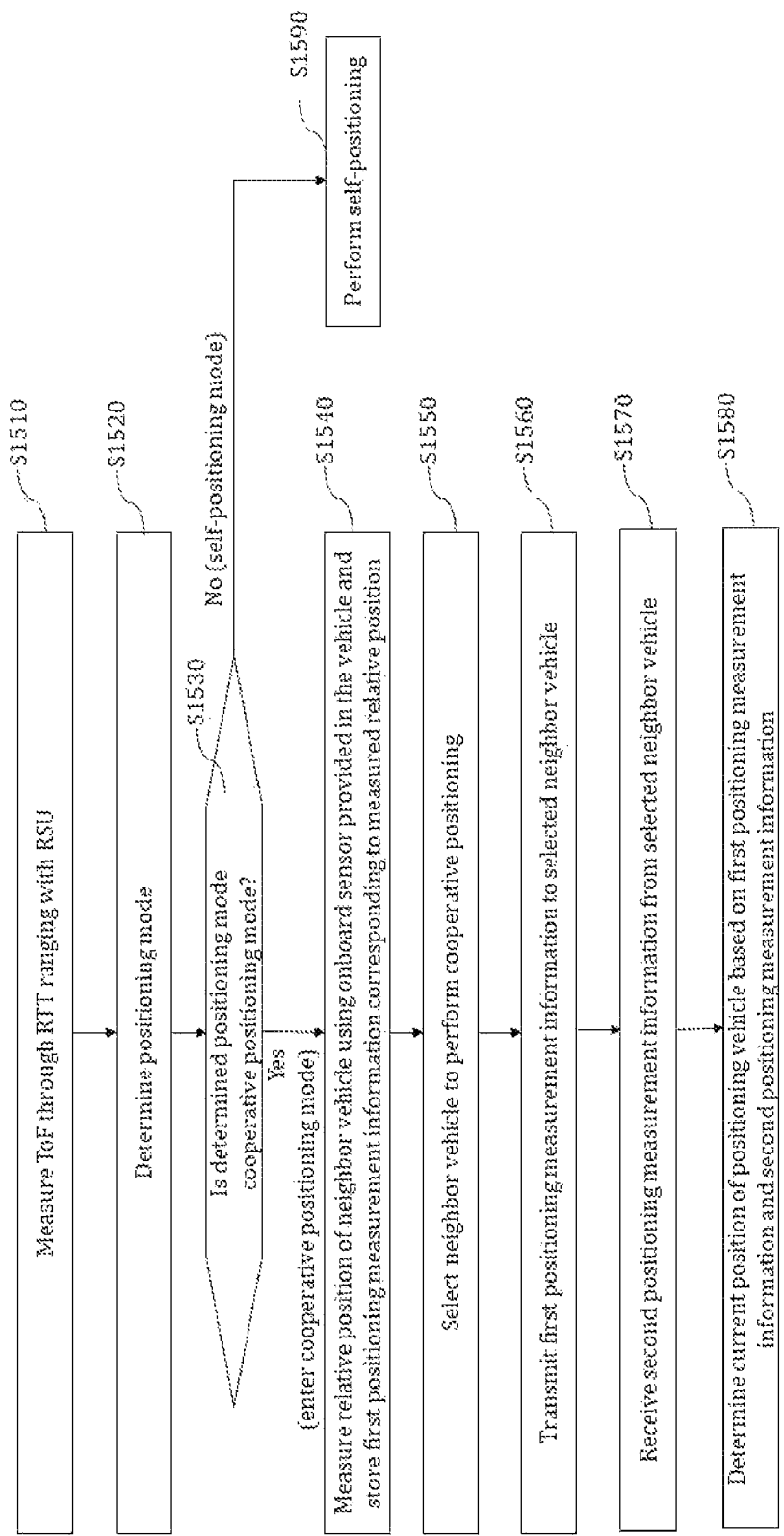
FIG. 15 is a diagram illustrating a method in which a UE mounted on a positioning vehicle performs positioning in a cellular vehicle-to-everything (C-V2X) communication system according to an embodiment.

FIG. 15 is a diagram illustrating a method in which a UE mounted on a positioning vehicle performs positioning in a C-V2X communication system according to an embodiment.

Referring to FIG. 15, the UE may measure a ToF by performing RTT ranging with an RSU (S1510). Here, the UE may perform RTT ranging with a single RSU.

The UE may determine a positioning mode (S1520). The positioning mode may include a self-positioning mode and a cooperative positioning mode. For example, the UE may determine the positioning mode based on whether the positioning vehicle is equipped with an onboard sensor for positioning, whether absolute position information of the positioning vehicle is present, an accuracy/reliability level of an absolute position, whether a neighbor vehicle is present, an accuracy/reliability level of a sensor mounted in the neighbor vehicle, and/or whether a CPM is received from the neighbor vehicle.

When the determined positioning mode is the cooperative positioning mode, the UE may measure a relative position of the neighbor vehicle using the onboard sensor provided in the positioning vehicle and store first positioning measurement information corresponding to the measured relative position in a positioning information storage device (S1530 to S1540).

The UE may select a neighbor vehicle to perform cooperative positioning (S1550).

The UE may transmit the first positioning measurement information to the selected neighbor vehicle (S1560).

The UE may receive second positioning measurement information from the selected neighbor vehicle (S1570).

For example, the first positioning measurement information and the second positioning measurement information may be transmitted/received through SCI of a PSCCH, SCI of a PSSCH, or data of the PSSCH. As another example, the first positioning measurement information and the second positioning measurement information may be transmitted through a dedicated or existing CPM.

As an example, the first positioning measurement information and the second positioning measurement information may be divided into essential positioning information and additional positioning information.

In an embodiment, the essential positioning information and the additional positioning information may be transmitted on the same resource or different resources. In an embodiment, the essential positioning information and the additional positioning information may be transmitted through the same channel or different channels. In an embodiment, the neighbor vehicle may provide at least one of the essential positioning information or the additional positioning information at the request of the positioning vehicle or may periodically/aperiodically provide at least one of the essential positioning information or the additional positioning information without the request of the positioning vehicle.

For example, the essential positioning information may include at least one of absolute position information of a corresponding vehicle, reliability/accuracy information about the absolute position information, information about a ToF measurement time at the corresponding vehicle, relative position information measured by the corresponding vehicle, or reliability/accuracy information about the relative position measured by the corresponding vehicle.

As an example, the additional positioning information may include at least one of information about a TDTR, information about a TDTT, information about a vehicle speed during relative position measurement, or information about a heading angle during relative position measurement.

The UE may determine a current position of the positioning vehicle based on the first positioning measurement information and the second positioning measurement information (S1580). As an example, the UE may predict a relative position change amount based on the second positioning measurement information and correct the measured relative position based on the predicted relative position change amount. The UE may calculate an absolute position of the positioning vehicle using the corrected relative position.

When the positioning mode determined in step S1520 is the self-positioning mode, the UE may perform self-positioning (S1530 to S1590).

Embodiment 2

The present embodiment relates to a sidelink positioning operation method, a positioning procedure, and positioning measurement for efficiently and flexibly obtaining an absolute position of a positioning vehicle by a UE mounted in the positioning vehicle on a road and in an area in which a single RSU is installed. The main operation of the proposed sidelink positioning may include: 1) a process in which the UE measures a ToF (or distance) through RTT ranging with the RSU, 2) a process of sharing or providing positioning measurement information between UEs, 3) a process in which the positioning vehicle measures a relative position of a neighbor vehicle using an onboard ranging sensor, and 4) a process in which the positioning vehicle performs positioning using the relative position of the neighbor UE measured by the positioning vehicle and position measurement information provided by the neighbor UE. In the above processes, RTT ranging may be performed using a PRS transmitted through an NR-V2X sidelink, and communication between UEs may be performed using the NR-V2X sidelink. A description of the terms used herein is given below.

A ToF between a vehicle and an RSU may be divided into $ToF_P$, which is a ToF between a positioning vehicle and an RSU, and $ToF_N$, which is a ToF between a neighbor vehicle and an RSU.

Next, the operation and process of the proposed sidelink positioning performed when a UE passes through an area (or road) in which a single RSU is installed will be described.

Positioning measurement information is information shared through sidelink in order for a positioning vehicle (or a positioning UE) to perform cooperative positioning with a neighbor vehicle (or a neighbor UE). The positioning measurement information may be shared with the neighbor vehicle through a CAM (or BSM), a DEMN, and/or a CPM according to the type of information or regardless of the type of information or may be shared with the neighbor UE through SCI of a PSCCH, SCI of a PSSCH, or data of the PSSCH of an NR-V2X service.

The positioning measurement information may include information about an absolute position of each UE, information about the reliability of the absolute position of each UE, information about a ToF measured at each UE, and information about a processing time $t_{processing}$ required until each UE transmits the information about the ToF after measuring the ToF.

The information about the reliability of the absolute position of each UE may be used to select a neighbor UE suitable for the positioning UE to perform cooperative positioning. In an embodiment, the reliability of the absolute position may be provided through an error variance for absolute position measurement.

The ToF measured at each UE may be measured by the UE performing RTT ranging using sidelink with the RSU.

The processing time $t_{processing}$ required until each UE transmits the ToF after measuring the ToF indicates a difference between a time at which the measured ToF is transmitted and a time at which the ToF is measured.

A process in which the UE measures the ToF through RTT ranging with the RSU: The UE may measure the ToF through RTT ranging with the RSU. In this case, the ToF may be measured using a PRS transmitted on sidelink. In addition, the positioning UE records a $ToF_P$ measurement time, and the $ToF_P$ measurement time may be recorded from the viewpoint of a time at which a request PRS is transmitted or a time at which a response PRS is received. Furthermore, the $ToF_P$ measurement time may be used to predict a relative position of the neighbor UE at a time point when the neighbor UE measures $ToF_N$.

A process of sharing or providing positioning measurements between UEs on sidelink: The process of sharing or providing positioning measurement information between UEs may be performed through two methods as follows. In this case, the positioning UE and the neighbor UE are assumed as follows.

Assumption: Basically, a UE may acquire an absolute position through a self-positioning process based on a single RSU. In self-positioning, the absolute position may be measured using 1) ToF information between a single RSU and the UE, and 2) position change amount information according to UE position variation (or a relative position between two changed points) measured through an IMU sensor including a gyroscope, an accelerometer, and a geomagnetic sensor. In this case, the accuracy of the measured absolute position may vary depending on the accuracy of the IMU sensor. The positioning UE (or positioning vehicle) may include an onboard ranging sensor, and a relative position of the neighbor UE measured through the onboard ranging sensor may provide higher accuracy than the relative position between two changed points measured through the IMU sensor.

Two methods of sharing or providing positioning measurements between UEs through sidelink will be described in detail.

Method-1: The above-described positioning measurement information provided between UEs may be provided when the positioning UE requests the neighbor UE to provide the positioning measurement information. In this case, the neighbor UE may be a UE designated/indicated/selected by the positioning UE or may be an unspecified UE. An embodiment in which the positioning UE designates the neighbor UE to request the positioning measurement information is as follows. Here, it is assumed that an absolute position and the reliability of the absolute position are shared through a CAM. The positioning UE may acquire information as to which UE is located in close proximity thereto while securing an LOS and information about an accuracy or reliability level of the absolute position, by analyzing the absolute position included in the CAM. After selecting the neighbor UE suitable for cooperative positioning based on the above acquired information, the positioning UE may obtain and request the positioning measurement information for cooperative positioning using an ID of the selected UE. In this case, positioning request information of the positioning UE may be transmitted to a designated/indicated neighbor UE through SCI of a PSCCH, SCI of a PSSCH, or data of the PSSCH of an NR-V2X service. Next, the neighbor UE that has accepted the request for the positioning measurement information may perform RTT ranging in order to measure $ToF_N$ and transmit the measured $ToF_N$ and processing time information, together with an ID of the positioning UE, to the positioning UE through the SCI of the PSCCH, the SCI of the PSSCH, or the data of the PSSCH. An embodiment in which the positioning UE requests the unspecified neighbor UE to provide the positioning measurement information is as follows. The positioning UE may request the neighbor UE to provide the positioning measurement information, for example, an absolute position, the reliability of the absolute position, a ToF, and/or a processing time, through the SCI of the PSCCH, the SCI of the PSSCH, or the data of the PSSCH. Next, upon accepting the request for the positioning measurement information, the neighbor UE may perform a process for acquiring related positioning measurement information and transmit the acquired positioning measurement information together with the ID of the positioning UE to the positioning UE.

Method-2: The positioning measurement information provided between UEs may be provided at all times or periodically/aperiodically by each UE regardless of a request by the positioning UE. That is, the positioning UE may periodically/aperiodically acquire the required positioning measurement information, for example, the absolute position, the reliability of the absolute position, the ToF, and/or the processing time, in consideration of cooperative positioning support and then transmit the acquired positioning measurement information to the neighbor UE. Through this method, the positioning UE may determine whether to perform cooperative positioning by detecting and analyzing the positioning measurement information provided by the neighbor UE.

A process in which the positioning UE measures a relative position of a neighbor UE using the onboard ranging sensor: The positioning UE may measure and record the relative position of the neighbor UE using the onboard sensor, a time at which the positioning UE measures the relative position, the speed of the positioning UE during relative position measurement, and/or the heading angle of the positioning UE during relative position measurement and stores the measured information in the positioning information storage device. In this case, the relative position of the neighbor UE and related additional information may be measured with respect to each neighbor UE, and the measured relative position and additional information may be stored in the positioning information storage device using a temporary ID corresponding to each neighbor UE.

A process in which the positioning UE measures a relative position between two changed points using the IMU sensor: The positioning UE may periodically or aperiodically measure, using the IMU sensor, the relative position between two changed points caused by the movement of a UE and store the measured relative position in the positioning information storage device.

A method and process in which the positioning UE selects positioning to be performed from among self-positioning and cooperative positioning: The upper layer of the C-V2X system may flexibly select a positioning method to be performed by the positioning UE in consideration of various variables such as the number of neighbor UEs, attainability/non-attainability of positioning measurement information by a neighbor UE, and a reliability/accuracy level of positioning measurement information. A description of the case in which the upper layer selects the self-positioning method and the case in which the upper layer selects the cooperative positioning method is replaced with the description of Embodiment 1 described above.

An operation and operation method of the upper layer of the C-V2X system for positioning: The upper layer may confirm whether a UE has entered an area in which an RSU is installed or whether there is an RSU around a UE, through a received V2X service, and receive control configuration information including PRS scheduling information required to perform positioning with the detected RSU. The upper layer determines whether to perform positioning based on the detected RSU by analyzing a reliability/accuracy level of an absolute position which is being measured and updated by a UE. If the upper layer determines that positioning is necessary because the accuracy level of the absolute position is lower than a threshold, the upper layer may determine whether to perform self-positioning or cooperative positioning based on positioning measurement information provided by the neighbor UE. When it is determined to perform positioning, the upper layer may request a lower layer of the C-V2X system to perform ToF measurement with the RSU through an RTT ranging operation.

A method in which the positioning UE performs cooperative positioning using positioning measurement information received from a neighbor UE: The positioning UE may perform cooperative positioning using positioning measurement information measured thereby (e.g., $ToF_p$, a time at which $ToF_p$ is measured, and/or a relative position of the neighbor UE) and positioning measurement information obtained from the neighbor UE (e.g., an absolute position, the reliability of the absolute position, and/or a ToF processing time). Here, the cooperative positioning method may be differently operated according to the number of neighbor UEs as described with reference FIG. 12 of Embodiment 1. Various positioning scenarios according to a single RSU and the number of UEs are replaced with the description of FIG. 12.

Next, a cooperative positioning procedure performed by the positioning UE will be described as an embodiment among various positioning procedures capable of being performed based on the above-described main operation for performing self-positioning or cooperative positioning. Assumptions for performing the cooperative positioning procedures will be described below.

Assumptions for performing the cooperative positioning procedure: A sensor operation of a UE is performed at all times or at regular time intervals, and a neighbor UE may measure positioning-related information necessary to perform cooperative positioning through a lidar/radar sensor, an odometer sensor, a geomagnetic sensor, and/or an IMU sensor. The positioning UE may measure a relative position of the neighbor UE through an onboard sensor and periodically/aperiodically store the measured relative position of the neighbor UE and additional information related to relative position measurement in the positioning information storage device. The positioning UE confirms, through the upper layer of the C-V2X system, that a UE has entered an area in which an RSU is installed and that there are two or more neighbor UEs capable of providing positioning measurement information for cooperative positioning. As a method of sharing the positioning measurement information between UEs, Method-2 described above is considered. The UE may periodically or aperiodically share the measured positioning measurement information, for example, an absolute position, the reliability of the absolute position, a ToF, and/or a processing time, with the neighbor UE. For example, the UE may obtain the ToF, measure/correct the absolute position using the obtained ToF, and finally share the positioning measurement information for cooperative positioning with the neighbor UE.

A procedure for the positioning UE to perform cooperative positioning using the positioning measurement information received from the neighbor UE may include the following steps Step-1 to Step-4.

Step-1: The positioning UE predicts an absolute position of the neighbor UE using an absolute position of the ego UE and a relative position of the neighbor UE measured through the sensor and store the predicted absolute position of the neighbor UE, a relative position used for the absolute position, and a time at which position information about the neighbor UE is obtained in the positioning information storage device. The time at which the position information about the neighbor UE is obtained may be recorded based on a time at which the relative position is measured, a time at which the absolute position is calculated, or a time recorded in the positioning information storage device. The positioning information storage device stores past data of a certain time based on a positioning information measurement time of the neighbor UE currently recorded with respect to the same UE, thereby tracking or predicting variation in the relative position and the absolute position from a past time point to a present time point.

Step-2: The positioning UE analyzes and identifies the neighbor UE that closely approaches the ego UE and secures an LoS through an operation of matching the absolute position of each UE received from the neighbor UE and the absolute position predicted by the ego UE of Step-1. Thereafter, the positioning measurement information provided by the identified neighbor UE is recorded in the positioning information storage device together with an ID of the UE. The identified neighbor UE is regarded as a UE capable of performing cooperative positioning sensed by the positioning UE, so that the identified neighbor UE may be tracked for a certain period of time. Information about variation of an absolute position or a relative position is recorded in the positioning information storage device.

Step-3: When an accuracy level of the absolute position for the ego UE is less than or equal to a threshold and a neighbor UE capable of performing cooperative positioning is detected, the positioning UE is requested to measure a ToF with the RSU by the upper layer and performs RTT ranging through a request/response PRS transmission/reception process through sidelink with the RSU. As a subsequent process, the positioning UE stores $ToF_P$ obtained by performing RTT ranging and information about a time at which $ToF_P$ is measured in the positioning information storage device.

Step-4: The positioning UE performs cooperative positioning using 1) $ToF_P$ measured at the ego UE, 2) $ToF_N$ measured at the identified neighbor UE in Step-2, and 3) a relative position between UEs (from the perspective of the positioning UE) at a time at which the positioning UE measures $ToF_P$ and at a time at which the identified neighbor UE measures $ToF_N$.

Next, a process of calculating an absolute position through cooperative positioning in consideration of the scenario of FIG. 12(b) will be described as an embodiment.

Figure 16:
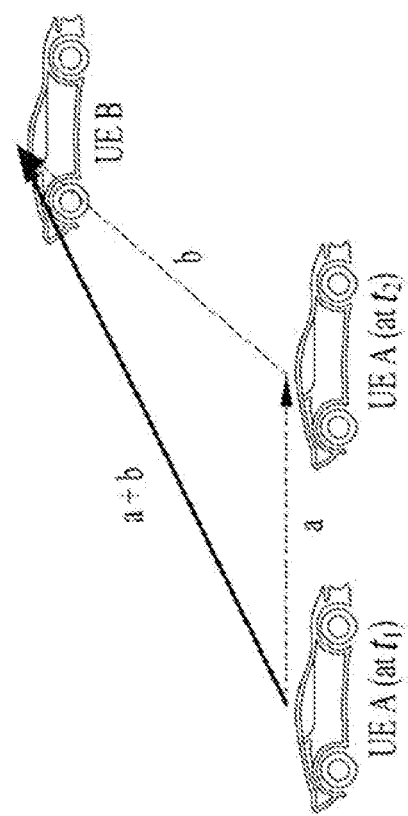
FIG. 16 is a diagram illustrating a method of predicting a relative position between UEs at a measurement time point by a positioning UE and a measurement time point by a neighbor UE.

The time at which the positioning UE measures $ToF_P$ and the time at which the neighbor UE measures $ToF_N$ may be the same or different. A position of the positioning UE at the time when the positioning UE measures $ToF_P$ and a position of the positioning UE at the time when the neighbor UE measures $ToF_N$ may be different. On the other hand, a relative position between UEs (from the perspective of the positioning UE) at the time when the positioning UE measures $ToF_P$ and at the time when the identified neighbor UE measures $ToF_N$ may be calculated or predicted using a relative position according to position variation of the ego UE recorded in the positioning information storage device (or a relative position between two changed points) and using a relative position of the neighbor UE measured by the positioning UE at the time when the neighbor UE measures $ToF_N$. Here, the relative position of the neighbor UE measured by the positioning UE at the time at which the neighbor UE measures $ToF_N$ may be calculated or predicted from information about the relative position recorded in the positioning information storage device using a processing time transmitted by the neighbor UE and a propagation time between the UEs. In this case, the propagation time between the UEs may be calculated from information about the relative position measured by the positioning UE. FIG. 16 illustrates a method of predicting a relative position between UEs at a time point at which a positioning UE measures $ToF_P$ and a time point at which a neighbor UE measures $ToF_N$. In an embodiment of FIG. 16, it is assumed that the position of the positioning UE at a time point $t_1$ when a positioning UE A measures $ToF_P$ is different from the position of the positioning UE A at a time point $t_2$ when a neighbor UE B measures $ToF_N$, and a vector a and a vector b may be defined as follows.

Vector a: A position change amount changed when the positioning UE A moves from a position at a time $t_1$ to a position at a time $t_2$ (a relative position between the two changed points)

Vector b: A relative position of the neighbor UE B measured by the positioning UE A at the time $t_2$ Accordingly, the relative position of the neighbor UE B at the time $t_1$ may be predicted as a+b, which is the sum of the vector a and the vector b.

The definition of variables for calculating an absolute position of the positioning UE A and the method of calculating the absolute position are replaced with the description of Embodiment 1.

Embodiment 3

Network-based cooperative OTDoA positioning is a method of improving position estimation performance of a positioning UE using positioning measurements related to the positioning UE, received from a neighbor UE, as well as positioning measurements received from the positioning UE, when a location server (LCS) estimates the position of a UE. In this case, the positioning UE means a UE for which the LCS desires to estimate an absolute position, and the neighbor UE means a UE located around the positioning UE. On the other hand, conventional OTDoA positioning does not support cooperative positioning. Therefore, in order to effectively provide the advantage of cooperative OTDoA based on the conventional OTDoA, it is necessary to define additional UE-assistance data and UE-assisted measurements for cooperative positioning in an LTE positioning protocol (LPP) procedure.

Next, a cooperative OTDoA positioning scenario and related operations will be described.

Figure 17:
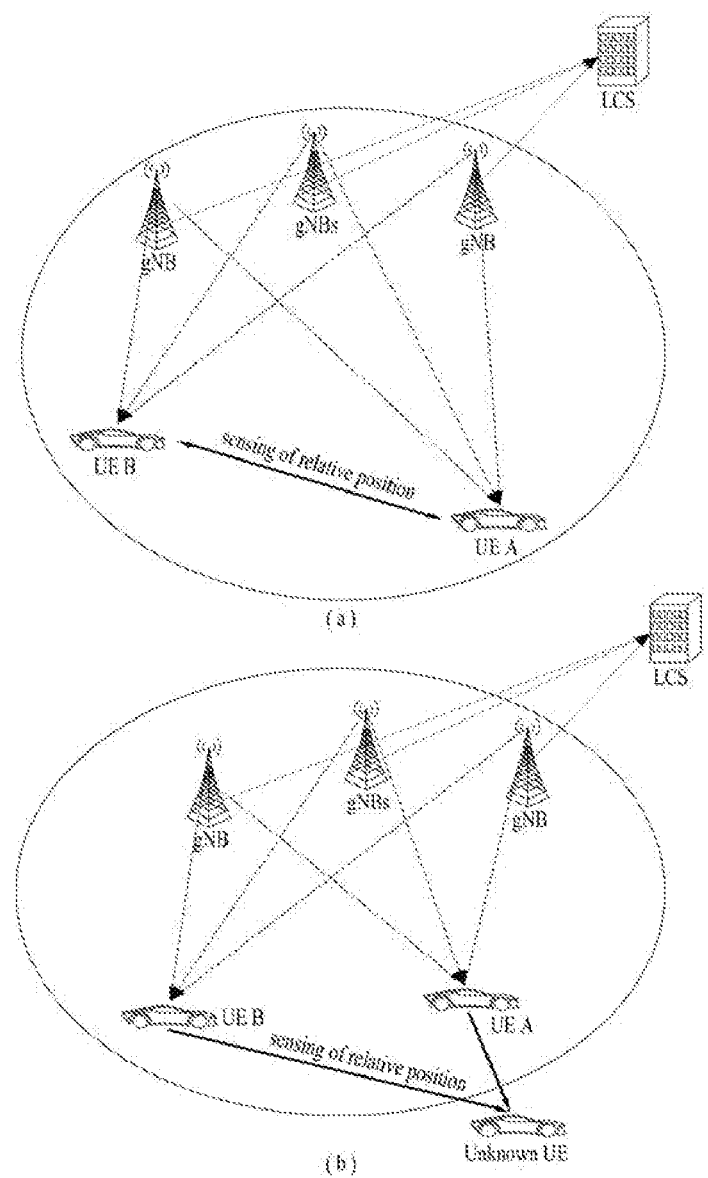
FIG. 17 is a diagram illustrating various embodiments of a cooperative observed time difference of arrival (OTDoA) positioning scenario.

FIG. 17 is a diagram illustrating various embodiments of a cooperative OTDoA positioning scenario.

FIG. 17(a) illustrates an embodiment of cooperative positioning between UEs located within network coverage. Each UE measures a reference signal time difference (RSTD) using a PRS received from a reference cell and a neighboring cell in the same/similar manner as/to a conventional non-cooperative OTDoA positioning process, additionally measures additional information for supporting cooperative OTDoA positioning, such as heading of a UE, a relative position of a neighbor UE, and a position change amount according to the movement of the UE during a time difference between an RSTD measurement time and a relative position measurement time of the neighbor UE, and reports the measured information to a gNB/LCS. Thereafter, the LCS estimates the absolute position of the UE using the measurements for cooperative positioning provided by the UE. FIG. 17(b) illustrates that the position of a UE located outside network coverage may be estimated through a cooperative OTDoA positioning process of a UE located within network coverage, as an embodiment of cooperative positioning between the UE located within network coverage and the UE located outside network coverage.

Next, various events that require cooperative OTDoA positioning will be described.

The LCS may perform cooperative OTDoA positioning upon determining that it is difficult to secure an LoS between a gNB and a UE due to an environmental influence such as interference and signal attenuation caused by multipath in an area in which the UE is located.

As illustrated in FIG. 17(b), the LCS may perform cooperative OTDoA positioning when the LCS desires to acquire the position of the UE located outside network coverage through the UE located within network coverage.

The LCS may perform cooperative OTDoA positioning when it is necessary to track the position of the UE with very high accuracy.

The LCS may perform cooperative OTDoA positioning when the LCS fails to track the position of the UE.

Next, an embodiment of an absolute position estimation process of a positioning UE through cooperative OTDoA positioning in the LCS will be described. Here, the LCS assumes that a time point at which each UE measures an RSTD and a time point at which each UE measures a relative position of a neighbor UE are the same.

A process of estimating an absolute position of the positioning UE through cooperative OTDoA positioning in the LCS may be performed as in Step-1 and Step-2 below.

Step-1: The LCS may first estimate an absolute position of a UE using an RSTD measured by each UE and an absolute position of a gNB participating in/contributing to the RSTD measurement process in the same/similar manner as/to the conventional non-cooperative OTDoA positioning.

Step-2: The LCS uses an absolute position of a positioning UE estimated by a neighbor UE located around the positioning UE in order to improve the accuracy of the absolute position of the UE. In this case, the absolute position of the positioning UE estimated by the neighbor UE is calculated by adding the absolute position of the neighbor UE estimated in Step-1 and a relative position of the positioning UE measured by the neighbor UE. As a result, the final absolute position of the positioning UE may be estimated as an average of absolute positions of the positioning UE obtained at spatially distributed positions.

Next, when the LCS estimates the absolute position of the positioning UE through cooperation between UEs, a method of detecting a valid neighbor UE (or measurement information for cooperative positioning provided by the neighbor UE) helpful to the positioning UE may be performed through Step-0 to Step-2 below.

Step-0: The LCS may estimate an absolute position of a UE using an RSTD measured by each UE and an absolute position of a gNB participating in/contributing to the RSTD measurement process.

Step-1: The LCS may estimate an absolute position of a neighbor UE (from the perspective of the positioning UE) using the absolute position of the positioning UE estimated in Step-0 and a relative position of the neighbor UE measured by the positioning UE. Next, the LCS may compare the absolute position of the neighbor UE estimated by the positioning UE and the absolute position of the neighbor UE estimated in Step-0 and select a neighbor UE, a difference between the absolute positions of which is within the error range, as a neighbor UE candidate to participate in cooperative OTDoA positioning. In this case, the error range may be variably set according to a positioning event or may be predefined.

Step-2: The LCS may estimate the absolute position of the neighbor UE (from the viewpoint of the selected neighbor UE) using the absolute position of the neighbor UE selected in Step-1 described above and a relative position of the neighbor UE measured by the selected neighbor UE. Next, the LCS compares the absolute position of the neighbor UE estimated above with the absolute position of the positioning UE. If a difference between the absolute positions is within an error range, the LCS may finally use the corresponding absolute position to estimate the absolute position of the positioning UE. As another alternative, the LCS may select a relative position that most highly matches the relative position of the selected neighbor UE measured by the positioning UE among relative positions of neighbor UEs measured by the selected neighbor UE and use the absolute position of the selected neighbor UE to estimate the final absolute position of the positioning UE.

Next, an operation for a UE to measure a relative position of a neighbor UE and other additional information, needed to support cooperative OTDoA positioning, will be described.

A UE measures a relative position of a neighbor UE using an onboard ranging sensor such as a Lidar/radar sensor and records a measurement time of the relative position. In addition, when measuring the relative position of the neighbor UE, the UE may measure a UE heading (or heading angle) using a sensor such as a yaw rate sensor. The measured relative position of the neighbor UE, a time at which the relative position is measured, and the heading during relative position measurement may be stored in the positioning information storage device using a temporary ID.

Next, an operation of measuring a position change amount (or a relative position between two changed points) according to the movement of a UE will be described.

The UE may use a sensor such as an IMU to periodically or aperiodically store a position change amount according to the movement of the UE in the positioning information storage device. The position change amount of the UE according to time may be used to correct an absolute position error that may be caused by mismatch between a time when the UE measures an RSTD (or a time when the UE receives a PRS from a gNB for the first time) and a time when the UE measures a relative position of a neighbor UE.

Next, the absolute position error caused by mismatch between the time when the UE measures the RSTD and the time when the UE measures the relative position of the neighbor UE may be corrected through Step-1 to Step-2 below.

Step-1: The LCS may predict an absolute position of the UE using an RSTD measured by the UE and an absolute position of a gNB participating in/contributing to the RSTD measurement process.

Step-2: The LCS may predict an absolute position at a time when the relative position of the neighbor UE is obtained by adding or subtracting the position change amount according to the movement of the UE to or from the absolute position obtained in Step-1 during a time difference between the RSTD measurement time provided by the UE and the measurement time the relative position of the neighbor UE.

Next, an LPP procedure for performing network-based OTDoA positioning and a measurement procedure supported by the UE will be described.

Figure 18:
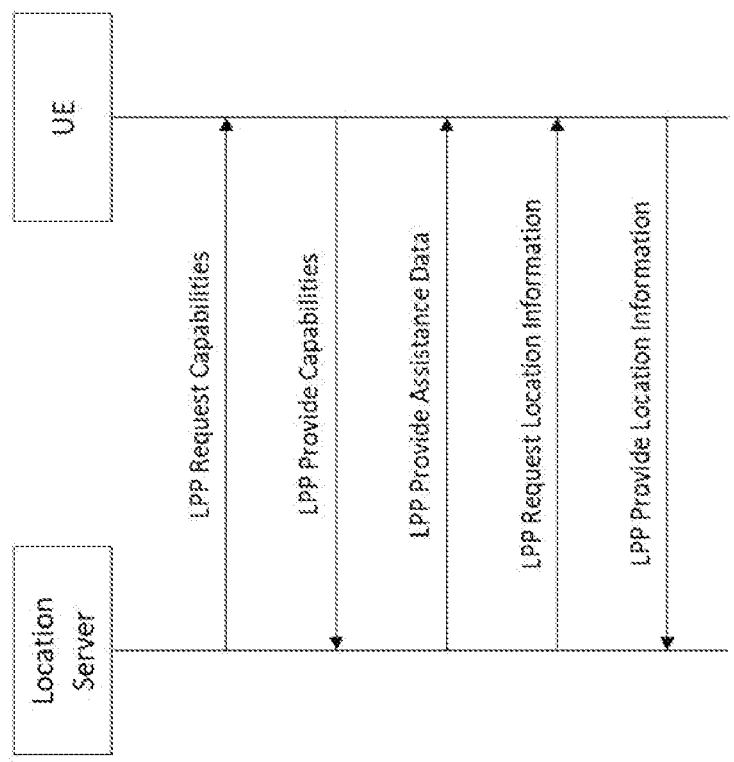
FIG. 18 illustrates a main procedure of an LTE positioning protocol (LPP) performed between a location server (LCS) and a UE.

FIG. 18 illustrates a main procedure of an LPP performed between an LCS (an E-SMLC or an SUPL SLP) and a UE.

A description of each procedure is as follows.

LPP Request Capabilities: The LCS may transmit a RequestCapabilities message to the UE. In this case, the LCS may request a report on capabilities of the UE required for the LCS to perform cooperative OTDoA positioning.

LPP Provide Capabilities: The UE may transmit a ProvideCapabilities message to the LCS in response to the RequestCapabilities message. In this case, the ProvideCapabilities message may include information about an OTDoA positioning mode, information about a supportable frequency band in which the UE is capable of measuring an RSTD, and information about whether the UE supports inter-frequency RSTD measurement. In an embodiment, the ProvideCapabilities message may further include information about whether the UE is capable of measuring a relative position of a neighbor UE, information about a method or a ranging sensor usable by the UE measure the relative position of the neighbor UE, information about a method or the performance of the ranging sensor used by the UE to measure the relative position of the neighbor UE, information about an optimal separation distance, a minimum separation distance, and a maximum separation distance of the ranging sensor used when the UE measures the relative position of the neighbor UE, information about the ability to identify a surrounding object of the ranging sensor used by the UE to measure the relative position of the neighbor UE, information related to the type and size of the UE that measures the relative position of the neighbor UE, information about the position of a UE equipped with the ranging sensor used when the UE measures the relative position of the neighbor UE, information about a method and a sensor used to measure a position change amount according to the movement of the UE, and information about a method and a sensor used to measure the heading angle of the UE.

An OTDoA positioning mode supported by the UE may be divided into a non-cooperative OTDoA positioning mode and a cooperative OTDoA positioning mode. In this case, an LPP supports only a UE-assisted mode, and the UE-based mode may be supported by LPP extension (LPPe).

The UE may measure the relative position of the neighbor UE using a Lidar or radar or may measure the relative position of the neighbor UE through sidelink.

The UE may measure a plurality of relative positions with respect to a surrounding object at an arbitrary Hz and then use a calculated variance value as an index for determining the accuracy level of the ranging sensor.

The UE may maximize the measurement performance of a relative position of a surrounding object through an optimal separation distance of the ranging sensor used to measure the relative position of the neighbor UE and guarantee a certain level of the measurement performance of the relative position of the surrounding object through a minimum separation distance and a maximum separation distance between the surrounding object and the ranging sensor.

The capability of the ranging sensor to identify the surrounding object, the ranging sensor being used by the UE to measure the relative position of the neighbor UE, may be determined based on resolution at which the surrounding object is capable of being identified, for example, a distance between identifiable surrounding objects, the maximum number of surrounding objects capable of being identified at a certain resolution, and a speed of identifying the surrounding object. Here, as the capability of the ranging sensor to identify a surrounding object becomes better, a speed of measuring a distance between surrounding objects increases. As a result, the speed of measuring a distance between objects located all around the UE is fast.

Information related to the type and size of the UE for measuring the relative position of the neighbor UE may include, when the UE is a vehicle, information about the entire horizontal and vertical lengths of the UE, the position of the ranging sensor mounted on the UE used when the UE measures the relative position of the neighbor UE, a method and a sensor used to measure a position change amount according to the movement of the UE, and information about a method and a sensor used to measure the heading angle of the UE. Here, when the UE is a vehicle, the ranging sensor may be located in a front bumper or a rear bumper of the vehicle. As the sensor used to measure the position change amount according to the movement of the UE, a sensor such as an IMU may be used, and as the sensor used to measure the heading angle (or direction) of the UE, a yaw rate sensor may be used LPP Provide Assistance Data: In order for the UE to measure the RSTD, information about a cell is required and thus the LCS may provide the UE with the following information related to a reference cell and a candidate neighbor cell for RSTD measurement through the ProvideAssistanceData message.

Information related to a reference cell for performing cooperative/non-cooperative OTDoA positioning (OTDoA Reference Cell Information): Elements included in the related information provide various parameters related to a physical cell ID (PCI) of the reference cell and to PRS configuration.

Information related to a neighbor candidate cell for cooperative/non-cooperative OTDoA positioning (OTDoA Neighbor Cell Information): Elements included in the related information provide various parameters related to a PCI of each neighbor cell associated with the reference cell and to PRS configuration. A list of neighboring cells is provided in descending order of priority, and the UE may report the measured RSTD to the LCS in the same descending order.

Information for cooperative OTDoA positioning support: Elements included in the related information may provide a guide as to information that the UE should provide to the LCS in order for the LCS to perform cooperative OTDoA positioning and include the maximum number of relative positions of a neighbor UE (a maximum of X relative positions) that the UE is capable of reporting after measurement. A list of relative positions of neighbor UEs reported by the UE to the LCS is recorded after the UE measures the relative positions of the neighbor UEs in a clockwise or counterclockwise direction based on global coordinates (or heading of the UE). In this case, each relative position is recorded in the list together with a temporary ID for a corresponding UE. The ID may be generated by sequentially assigning numbers or may be generated as an arbitrary ID. The list of the relative positions of the neighbor UEs reported by the UE to the LCS may include heading information of the UE recorded when measuring each relative position. In this case, each heading information may be recorded using the same ID as the temporary ID for the corresponding UE used during recording of the relative position or using another arbitrary ID.

The number of pieces of heading information reported by the UE to the LCS may be one. In an embodiment, one piece of heading information may be reported as an average value of heading angles recorded after the UE completes the measurement of the relative position of the neighbor UE.

"The position change amount according to the movement of the UE during the time difference between the time when the UE measures the RSTD and the time when the UE measures the relative position of the neighbor UE", reported by the UE to the LCS, may be included in the list of the relative positions of the neighbor UEs described above or may be composed as a separate list. In this case, information about each position change amount may be recorded using the same ID as a temporary ID for the corresponding UE used during recording of the relative position or using another arbitrary ID.

The number of pieces of information about the position change amount according to the movement of the UE, reported by the UE to the LCS, may be one. In an embodiment, one piece of heading information may be reported as an average value of position change amounts according to the movement of the UE recorded after the UE completes the measurement of the relative position of the neighbor UE.

LPP Request Location Information: To request the UE to measure the RSTD, the relative position of the neighbor UE needed to support cooperative OTDoA positioning, and other additional information capable of improving the performance of cooperative positioning, the LCS may transmit a RequestLocationInformation message. In this case, the RequestLocationInformation message may include information about a location information type, desired accuracy, a response time, environment characterization, and the like. The location information type may be set to a UE-assisted mode. In the case of non-cooperative OTDoA positioning in relation to the desired accuracy, the LCS may calculate the accuracy of location estimation using the RSTD measured at the UE. On the other hand, in the case of cooperative OTDoA positioning, the LCD may calculate the accuracy of location estimation using 1) an absolute position predicted using the RSTD measured at the positioning UE, and 2) an absolute position of the positioning estimated using the RSTD measured at the neighbor UE and using a relative position of the positioning UE. In relation to the response time, the UE may transmit a ProvideLocationInformation message to the LCS after the response time (or standby time) has elapsed after receiving the RequestLocationInformation message. In relation to the environment characterization, the LCS may provide the UE with channel environment information such as multipath or an LoS expected for an area in which the UE is located.

LPP Provide Location Information: After receiving the RequestLocationInformation message, the UE may measure the RSTD and information for cooperative OTDoA support using assistance information provided by the LCS and transmit the ProvideLocationInformation message to the LCS after the response time elapses. The ProvideLocationInformation message may include various elements such as a time stamp when the UE measures the RSTD, a time at which the UE measures a relative position of the neighbor UE and additional information related to the relative position of the neighbor UE, an ID of a reference cell, time of arrival (ToA) quality measured from the reference cell, a list of (a maximum of 24) RSTDs measured from the reference cell or the neighbor cell, a list of (a maximum of X) relative positions of the neighbor UE measured by the UE, heading information of the UE recorded when the relative position of the neighbor UE is measured, the quality of the measured heading information, a position change amount measured according to movement of the UE during a time difference between a time when the UE measures an RSTD and a time when the UE measures the relative position of the neighbor UE, recorded when the UE measures the relative position of the neighbor UE. and the quality of the measured position change amount. Here, the list of the RSTDs measured in the reference cell and the neighboring cell may include an ID of the measured neighbor cell, RSTD measurement values, and information about the measured RSTD quality. The quality of the measured relative position of the neighbor UE may be provided as a variance value calculated after a plurality of relative positions is measured at an arbitrary Hz with respect to the neighbor UE.

FIG. 18 illustrates a main procedure of an LPP performed between an LCS and a UE according to the embodiment.

Referring to FIG. 18, the LCS may make a request to the UE for LPP request capabilities, and the UE may provide the LPP capabilities thereof to the LCS in response to the request for the LPP request capabilities. The LCS may provide LPP assistance data to the UE and make a request to the UE for LPP location information. The UE may provide LPP location information to the LCS in response to the request for the LPP location information.

Examples of the above-described proposed methods may also be included in one of implementation methods of the present disclosure and, therefore, it is obvious that the examples are regarded as the proposed methods. In addition, although the above-described proposed methods may be independently implemented, the proposed methods may be implemented in the form of a combination (or aggregate) of some of the proposed methods. A rule may be defined such that information as to whether the proposed methods are applied (or information about rules of the proposed methods) may be indicated to the UE by the BS through a predefined signal (e.g., physical layer or higher layer signal).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
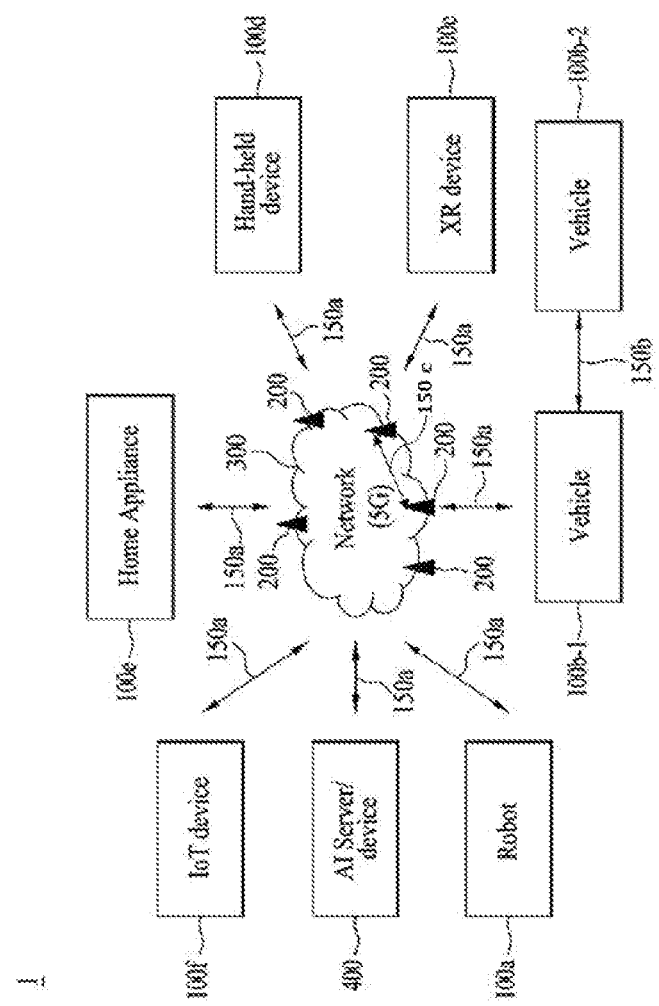
FIG. 19 illustrates a communication system applied to the present disclosure.

FIG. 19 illustrates a communication system applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless device to which present disclosure is applied.

Figure 20:
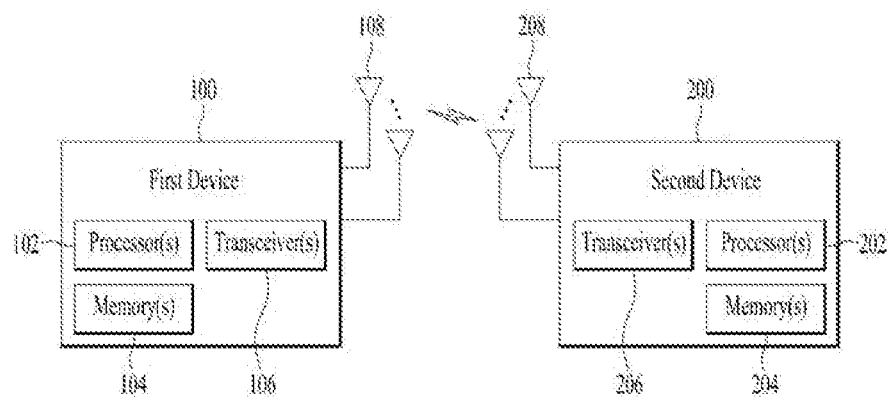
FIG. 20 illustrates wireless devices applicable to the present disclosure.

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor 102 and the memory 104 that are connected to the RF transceiver. The memory 104 may contain at least one program for performing an operation related to the embodiments described with reference to FIGS. 12 to 17.

The processor 102 may measure a ToF by performing RTT ranging with an RSU, determine a positioning mode, wherein the positioning mode includes a self-positioning mode and a cooperative positioning mode, measure a relative position of a neighbor vehicle using a sensor mounted in the positioning vehicle based on the determined positioning mode being the cooperative positioning mode, store first positioning measurement information related to the measured relative position, select a neighbor vehicle to perform cooperative positioning, transmit the first positioning measurement information to the selected neighbor vehicle, receive second positioning measurement information from the selected neighbor vehicle, and determine a current position of the positioning vehicle based on the first positioning measurement information and the second positioning measurement information. The processor 102 may perform an operation for determining an absolute position (or relative position) of a UE according to embodiments for performing a sidelink positioning method in a C-V2X system described with reference to FIGS. 12 to 18 based on a program included in the memory 104.

A chip set including the processor 102 and the memory 104 may be configured. In this case, the chip set may include at least one processor and at least one memory operatively connected to the at least one processor and allowing the at least one processor to perform an operation when being executed. The operation may include measuring a ToF by performing RTT ranging with an RSU, determining a positioning mode, wherein the positioning mode includes a self-positioning mode and a cooperative positioning mode, measuring a relative position of a neighbor vehicle using a sensor mounted in the positioning vehicle based on the determined positioning mode being the cooperative positioning mode, and storing first positioning measurement information related to the measured relative position, selecting a neighbor vehicle to perform cooperative positioning, transmitting the first positioning measurement information to the selected neighbor vehicle, receiving second positioning measurement information from the selected neighbor vehicle, and determining a current position of the positioning vehicle based on the first positioning measurement information and the second positioning measurement information. The processor 102 may perform an operation for determining an absolute position (or relative position) of a UE according to embodiments for performing a sidelink positioning method in a C-V2X system described with reference to FIGS. 12 to 18 based on a program included in the memory 104.

A computer readable recording medium including at least computer program for allowing the at least one processor to perform an operation may be provided. The operation may include measuring a ToF by performing RTT ranging with an RSU, determining a positioning mode, wherein the positioning mode includes a self-positioning mode and a cooperative positioning mode, measuring a relative position of a neighbor vehicle using a sensor mounted in the positioning vehicle based on the determined positioning mode being the cooperative positioning mode, and storing first positioning measurement information related to the measured relative position, selecting a neighbor vehicle to perform cooperative positioning, transmitting the first positioning measurement information to the selected neighbor vehicle, receiving second positioning measurement information from the selected neighbor vehicle, and determining a current position of the positioning vehicle based on the first positioning measurement information and the second positioning measurement information. The processor 102 may perform an operation for determining an absolute position (or relative position) of a UE according to embodiments for performing a sidelink positioning method in a C-V2X system described with reference to FIGS. 12 to 18 based on a program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may measure a ToF by performing RTT ranging with an RSU, determine a positioning mode, wherein the positioning mode includes a self-positioning mode and a cooperative positioning mode, measure a relative position of a neighbor vehicle using a sensor mounted in the positioning vehicle based on the determined positioning mode being the cooperative positioning mode, store first positioning measurement information related to the measured relative position, select a neighbor vehicle to perform cooperative positioning, transmit the first positioning measurement information to the selected neighbor vehicle, receive second positioning measurement information from the selected neighbor vehicle, and determine a current position of the positioning vehicle based on the first positioning measurement information and the second positioning measurement information. The processor 202 may perform an operation for determining an absolute position (or relative position) of a UE according to embodiments for performing a sidelink positioning method in a C-V2X system described with reference to FIGS. 12 to 18 based on a program included in the memory 204.

A chip set including the processor 202 and the memory 204 may be configured. In this case, the chip set may include at least one processor and at least one memory operatively connected to the at least one processor and allowing the at least one processor to perform an operation when being executed. The operation may include measuring a ToF by performing RTT ranging with an RSU, determining a positioning mode, wherein the positioning mode includes a self-positioning mode and a cooperative positioning mode, measuring a relative position of a neighbor vehicle using a sensor mounted in the positioning vehicle based on the determined positioning mode being the cooperative positioning mode, and storing first positioning measurement information related to the measured relative position, selecting a neighbor vehicle to perform cooperative positioning, transmitting the first positioning measurement information to the selected neighbor vehicle, receiving second positioning measurement information from the selected neighbor vehicle, and determining a current position of the positioning vehicle based on the first positioning measurement information and the second positioning measurement information. The processor 202 may perform an operation for determining an absolute position of a UE according to embodiments for performing a sidelink positioning method in a C-V2X system described with reference to FIGS. 12 to 18 based on a program included in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 21:
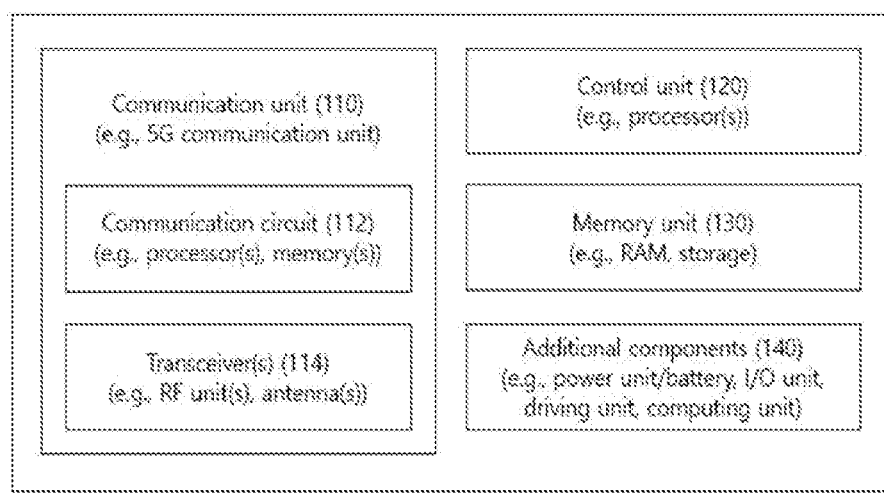
FIG. 21 illustrates another example of a wireless device applicable to the present disclosure.

FIG. 21 illustrates another example of a wireless device applied to the present disclosure. The wireless device may be implemented in various forms according to a use-case/service (refer to FIG. 19).

Referring to FIG. 21 wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a FinTech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 22:
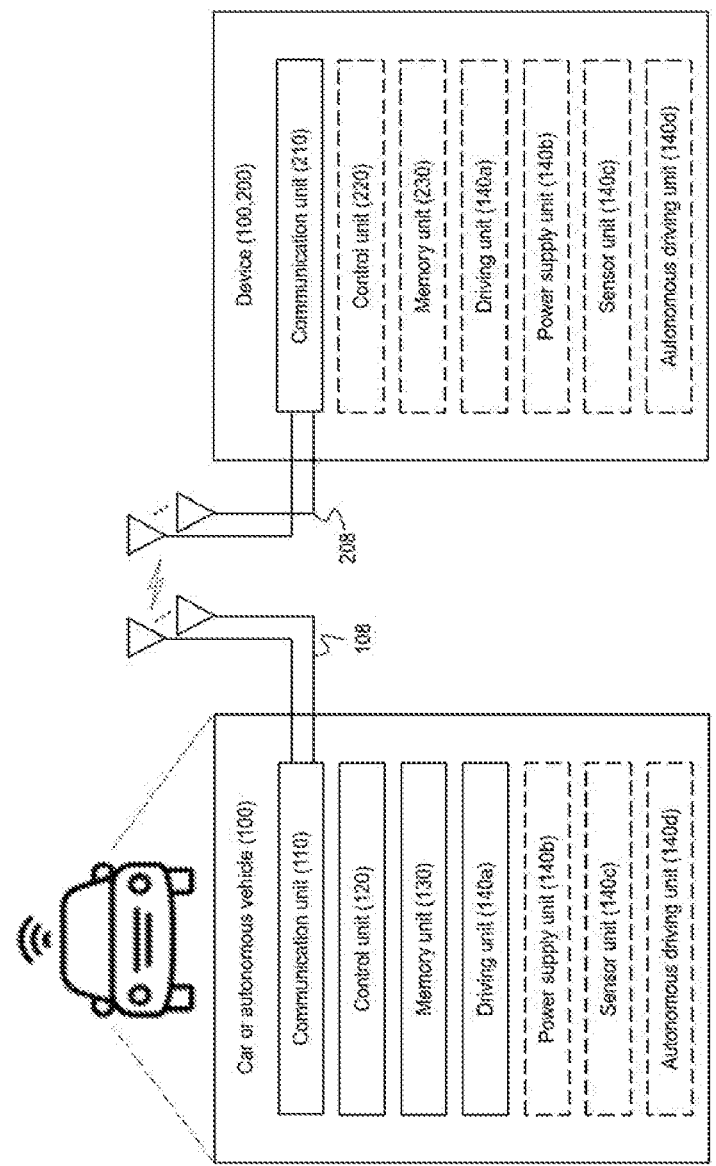
FIG. 22 illustrates a vehicle or an autonomous driving vehicle applied to the present disclosure.

Example of a Vehicle or an Autonomous Driving Vehicle to which the Present Disclosure is Applied FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL(non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various embodiments of the present disclosure described above are combinations of elements and features of the present disclosure.

The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user.

The embodiments according to the present disclosure may be implemented by various means, for example, hardware, firmware, software, or a combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure may be applied to various devices for communication through sidelink.

The invention claimed is:

1. A method of performing positioning by a user equipment (UE) mounted in a positioning vehicle in a cellular vehicle-to-everything (C-V2X) communication system, the method comprising:
measuring a time of flight (ToF) by performing round trip time (RTT) ranging with a road side unit (RSU);
determining a positioning mode, wherein the positioning mode includes a self-positioning mode and a cooperative positioning mode;
measuring a relative position of a neighbor vehicle using a sensor mounted in the positioning vehicle based on the determined positioning mode being the cooperative positioning mode, and storing first positioning measurement information related to the measured relative position;
selecting a neighbor vehicle to perform cooperative positioning;
transmitting the first positioning measurement information to the selected neighbor vehicle;
receiving second positioning measurement information from the selected neighbor vehicle; and
determining a current position of the positioning vehicle based on the first positioning measurement information and the second positioning measurement information.

2. The method of claim 1, wherein the RTT ranging is performed with respect to a single RSU.

3. The method of claim 1, wherein the first positioning measurement information and the second positioning measurement information include essential measurement information including at least one of information about an absolute position of a corresponding vehicle, information about reliability of the absolute position, information about a ToF measurement time at the corresponding vehicle, information about a relative position measured by the corresponding vehicle, or information about reliability of the relative position measured by the corresponding vehicle.

4. The method of claim 3, wherein the first positioning measurement information and the second positioning measurement information further include additional measurement information including at least one of information about a time difference between a ToF measurement time and a relative position measurement time, information about a time difference between the ToF measurement time and a transmission time of the measured ToF, information about a vehicle speed during relative position measurement, or information about a heading angle during relative position measurement.

5. The method of claim 4, further comprising:
estimating a time duration between a ToF measurement time and a relative position measurement time of the neighbor vehicle based on the additional measurement information received from the selected neighbor vehicle;
estimating change amounts of a speed and heading direction of the positioning vehicle related to the estimated time duration; and
correcting the relative position received from the neighbor vehicle based on the estimated change amounts of the speed and heading direction of the positioning vehicle and on a speed and heading direction of the neighbor vehicle.

6. The method of claim 1, wherein the positioning mode is determined based on whether the sensor is provided and on a collective perception message (CPM) received from the neighbor vehicle.

7. The method of claim 6, wherein an ID of a neighbor vehicle, the number of neighbor vehicles capable of performing cooperative positioning, and a positioning capability and level of a neighbor vehicle are identified based on the CPM, and a neighbor vehicle to perform cooperative positioning is determined based on the identified positioning capability and level of a neighbor vehicle.

8. The method of claim 7, wherein the first positioning measurement information and the second positioning measurement information are transmitted and received through sidelink control information (SCI) of a physical sidelink control channel (PSCCH), SCI of a physical sidelink shared channel (PSSCH), or data of the PSSCH.

9. The method of claim 1,
wherein the sensor includes an inertial measurement unit including a gyroscope, an accelerometer, and a geomagnetic sensor,
wherein, based on the number of selected neighbor vehicles being one, cooperative positioning is performed based on a relative position change amount according to vehicle position variation measured through the inertial measurement unit, the first positioning measurement information, and the second positioning measurement information, and
wherein, based on the number of selected neighbor vehicles being two, cooperative positioning is performed based on the first positioning measurement information and the second positioning measurement information.

10. The method of claim 1, wherein the current position of the positioning vehicle is determined based on absolute coordinates of the RSU, an absolute position of the positioning vehicle, a ToF measured at the positioning vehicle, an absolute position of the selected neighbor vehicle, and a ToF measured at the selected neighbor vehicle.

11. A user equipment (UE) mounted in a positioning vehicle, for performing positioning, in a cellular vehicle-to-everything (C-V2X) communication system, the UE comprising:
a radio frequency (RF) transceiver; and
a processor connected to the RF transceiver,
wherein the processor measures a time of flight (ToF) by performing round trip time (RTT) ranging with a road side unit (RSU), determines a positioning mode, wherein the positioning mode includes a self-positioning mode and a cooperative positioning mode, measures a relative position of a neighbor vehicle using a sensor mounted in the positioning vehicle based on the determined positioning mode being the cooperative positioning mode, stores first positioning measurement information related to the measured relative position, selects a neighbor vehicle to perform cooperative positioning, transmits the first positioning measurement information to the selected neighbor vehicle, receives second positioning measurement information from the selected neighbor vehicle, and determines a current position of the positioning vehicle based on the first positioning measurement information and the second positioning measurement information.

12. The UE of claim 11, wherein the processor performs the RTT ranging with respect to a single RSU.

13. The UE of claim 11, wherein the first positioning measurement information and the second positioning measurement information include essential measurement information including at least one of information about an absolute position of a corresponding vehicle, information about reliability of the absolute position, information about a ToF measurement time at the corresponding vehicle, information about a relative position measured by the corresponding vehicle, or information about reliability of the relative position measured by the corresponding vehicle.

14. The UE of claim 13, wherein the first positioning measurement information and the second positioning measurement information further include additional measurement information including at least one of information about a time difference between a ToF measurement time and a relative position measurement time, information about a time difference between the ToF measurement time and a transmission time of the measured ToF, information about a vehicle speed during relative position measurement, or information about a heading angle during relative position measurement.

15. The UE of claim 14, wherein the processor estimates a time duration between a ToF measurement time and a relative position measurement time of the neighbor vehicle based on the additional measurement information received from the selected neighbor vehicle, estimates change amounts of a speed and heading direction of the positioning vehicle related to the estimated time duration, and corrects the relative position received from the neighbor vehicle based on the estimated change amounts of the speed and heading direction of the positioning vehicle and on a speed and heading direction of the neighbor vehicle.

16. The UE of claim 11, wherein the processor determines the positioning mode based on whether the sensor is provided and on a collective perception message (CPM) received from the neighbor vehicle.

17. The UE of claim 16, wherein the processor identifies an ID of a neighbor vehicle, the number of neighbor vehicles capable of performing cooperative positioning, and a positioning capability and level of a neighbor vehicle, based on the CPM, and determines a neighbor vehicle to perform cooperative positioning based on the identified positioning capability and level of a neighbor vehicle.

18. The UE of claim 17, wherein the first positioning measurement information and the second positioning measurement information are transmitted and received through sidelink control information (SCI) of a physical sidelink control channel (PSCCH), SCI of a physical sidelink shared channel (PSSCH), or data of the PSSCH.

19. The UE of claim 11,
wherein the sensor includes an inertial measurement unit including a gyroscope, an accelerometer, and a geomagnetic sensor,
wherein, based on the number of selected neighbor vehicles being one, the processor performs cooperative positioning based on a relative position change amount according to vehicle position variation measured through the inertial measurement unit, the first positioning measurement information, and the second positioning measurement information, and
wherein, based on the number of selected neighbor vehicles being two, the processor performs cooperative positioning based on the first positioning measurement information and the second positioning measurement information.

20. The UE of claim 11, wherein the processor determines the current position of the positioning vehicle based on absolute coordinates of the RSU, an absolute position of the positioning vehicle, a ToF measured at the positioning vehicle, an absolute position of the selected neighbor vehicle, and a ToF measured at the selected neighbor vehicle.

* * * * *